Figure 1:
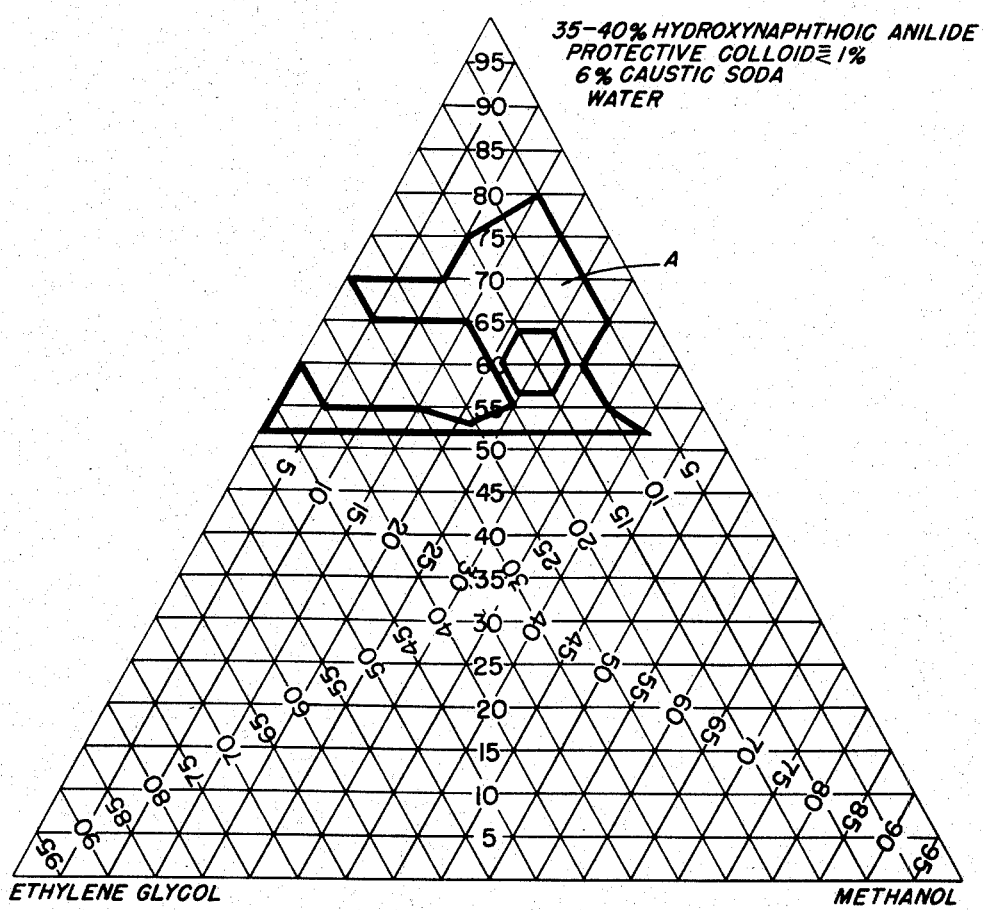

April 21, 1959  P. F. SPITZER, JR., ET AL  2,883,258
STABLE CONCENTRATED NAPHTHOL SOLUTIONS
Filed May 26, 1958  36 Sheets-Sheet 1

INVENTORS.
PENN F. SPITZER JR.
LESLIE L. PERRY
BY
AGENT.

April 21, 1959 P. F. SPITZER, JR., ET AL 2,883,258
STABLE CONCENTRATED NAPHTHOL SOLUTIONS
Filed May 26, 1958 36 Sheets-Sheet 9

INVENTORS.
PENN F. SPITZER JR.
LESLIE L. PERRY
BY
AGENT.

April 21, 1959 P. F. SPITZER, JR., ET AL 2,883,258
STABLE CONCENTRATED NAPHTHOL SOLUTIONS
Filed May 26, 1958 36 Sheets-Sheet 12

INVENTORS.
PENN F. SPITZER JR.
LESLIE L. PERRY
BY

AGENT.

April 21, 1959 — P. F. SPITZER, JR., ET AL — 2,883,258
STABLE CONCENTRATED NAPHTHOL SOLUTIONS
Filed May 26, 1958 — 36 Sheets-Sheet 18

INVENTORS.
PENN F. SPITZER JR.
LESLIE L. PERRY
BY
AGENT.

April 21, 1959 P. F. SPITZER, JR., ET AL 2,883,258
STABLE CONCENTRATED NAPHTHOL SOLUTIONS
Filed May 26, 1958 36 Sheets—Sheet 23

INVENTORS.
PENN F. SPITZER JR.
BY　　LESLIE L. PERRY

AGENT.

April 21, 1959 P. F. SPITZER, JR., ET AL 2,883,258
STABLE CONCENTRATED NAPHTHOL SOLUTIONS
Filed May 26, 1958 36 Sheets-Sheet 24

INVENTORS.
PENN F. SPITZER JR.
LESLIE L. PERRY
BY
AGENT.

April 21, 1959 P. F. SPITZER, JR., ET AL 2,883,258
STABLE CONCENTRATED NAPHTHOL SOLUTIONS
Filed May 26, 1958 36 Sheets-Sheet 26

INVENTORS.
PENN F. SPITZER JR.
LESLIE L. PERRY
BY
AGENT.

April 21, 1959 P. F. SPITZER, JR., ET AL 2,883,258
STABLE CONCENTRATED NAPHTHOL SOLUTIONS
Filed May 26, 1958 36 Sheets-Sheet 30

INVENTORS.
PENN F. SPITZER JR.
LESLIE L. PERRY
BY
AGENT.

April 21, 1959 — P. F. SPITZER, JR., ET AL — 2,883,258
STABLE CONCENTRATED NAPHTHOL SOLUTIONS
Filed May 26, 1958 — 36 Sheets-Sheet 34

INVENTORS.
PENN F. SPITZER JR.
LESLIE L. PERRY
BY
AGENT.

April 21, 1959 P. F. SPITZER, JR., ET AL 2,883,258
STABLE CONCENTRATED NAPHTHOL SOLUTIONS
Filed May 26, 1958 36 Sheets-Sheet 36

INVENTORS.
PENN F. SPITZER JR.
LESLIE L. PERRY
BY
AGENT.

United States Patent Office 2,883,258
Patented Apr. 21, 1959

2,883,258

STABLE CONCENTRATED NAPHTHOL SOLUTIONS

Penn F. Spitzer, Jr., South Bound Brook, and Leslie L. Perry, Plainfield, N.J., assignors to American Cyanamid Company, New York, N.Y., a corporation of Maine Continuation of applications Serial Nos. 564,946, 564,947, 565,064, 565,065, 565,068, 565,069, 565,145, all filed February 13, 1956. This application May 26, 1958, Serial No. 737,971

63 Claims. (Cl. 8—46)

This invention relates to stable concentrated solutions of various coupling components. More specifically, it relates to stable solutions of high concentration of certain of those coupling components known in the art as Naphthol AS type coupling components. Most specifically, it relates to concentrated solutions of the following compounds:

2-hydroxy-3-naphthoic anilide (Naphthol AS)
2-hydroxy-3-naphthoic-m-nitranilide (Naphthol ASBS)
2-hydroxy-3-naphthoic-o-toluidide (Naphthol ASD)
2-hydroxy-3-naphthoic-o-anisidide (Naphthol ASOL)
2 - hydroxy - 3 - naphthoic - β - naphthylamide (Naphthol ASSW)
2-hydroxy-3-naphthoic-o-phenetidide (Naphthol ASPN)
4,4' - di(acetoamido) - 3,3' - dimethyl biphenyl (Naphthol ASG)

The technique of dyeing water-insoluble azo dyestuffs was first developed about 60 years ago, by Horace Koechlin on the one hand, and by the chemists v. Gallois and Ullrich on the other. These important dyestuffs, which are generally termed "ice colors," are formed in situ on the fiber by an impregnation with a phenolic body, followed by development with a diazo solution.

The azoic dyestuffs were eagerly adopted in printing as well as in dyeing. The introduction of these dyestuffs into general practice has led to new methods of application.

One of the important types of coupling reagents used for producing insoluble azo dyestuffs on the fiber are represented by 2-hydroxy-3-naphthoic arylides, as illustrated by the anilide which has the formula:

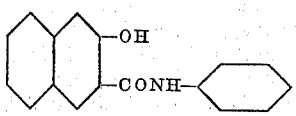

Throughout the specification and claims this compound will be referred to as hydroxynaphthoic anilide. The other arylides will be referred to, in a similar manner, as the toluidide, anisidide, etc. In addition to the six arylides of hydroxy-naphthoic acid, a somewhat different compound, of the structure:

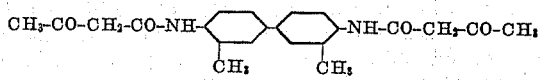

is also used in the same manner, under the name Naphthol ASG, which name will be used throughout the specification and claims instead of the more complicated chemical name 4,4'-di(acetoacetamido)-3,3'-dimethylbiphenyl. The azo dyes produced with these naphthol compounds have many advantages. With hydroxynaphthoic anilide the fastness to light and washing is considerably improved, the depth and brightness of color are enhanced, and the blue produced with dianisidine is not only deeper and brighter, but faster to acids, perspiration and light than corresponding β-naphthol couplings. Similarly, the other Naphthols give a useful color with various fast bases, as is well known in the art.

The physical properties of these naphthol AS coupling components can be described as follows:

| Naphthol: | Physical appearance |
|---|---|
| AS | Light tan powder. |
| ASBS | Light green powder. |
| ASD | Light tan powder. |
| ASOL | Light tan powder. |
| ASSW | Light tan powder. |
| ASPN | Light tan powder. |
| ASG | White powder. |

They are sparingly soluble in organic solvents but readily soluble in caustic soda solutions, giving generally yellow fluorescent solutions.

Solutions of the Naphthol AS type of coupling component have now been introduced to the trade. This has simplified the operator's problem of standardizing his dyebath solution and minimized the number of steps required in the dyeing operation.

We have now discovered new liquid compositions which contain large percentages of the various Naphthols in solution. It is an advantage of our new solutions that they are stable for periods exceeding six months and may be diluted with additional water to any desired concentration without precipitation or separation of solids. It is a further advantage of our solutions that they have a low vapor pressure and are therefore slow to evaporate, evaporation resulting in crystallization of the solute. An important result of the decreased vapor pressure, however, is that the fire hazard always present with organic solvents, is materially reduced.

The primary importance of our invention, however, is the large amount of the Naphthols dissolved. Whereas heretofore no one has succeeded in stabilizing solutions containing more than 20% hydroxynaphthoic anilide, e.g., our new compositions contain as much as 40% hydroxynaphthoic anilide. Similarly, the other Naphthols such as ASD and ASSW can also be obtained in 40% solutions. Of the seven Naphthols listed above, with which this application is concerned, only Naphthol ASG and Naphthol ASBS cannot be dissolved to this extent having much lower solubilities. These however have heretofore been sold in much lower concentrations and the 20% solutions achievable by our invention is proportionately as great an advance in the art as the 40% solutions of the other five Naphthols.

Such highly concentrated solutions are very desirable, because they reduce shipping and handling costs and require less storage space.

Our composition may contain, in addition to large quantities of the naphthol dissolved in aqueous caustic, approximately 1% of a protective colloid. This protective colloid is not absolutely necessary; it functions primarily to prevent precipitation or clouding on dilution. Of the protective colloids available commercially, we have found "Zein 3307" and "Protovac PV8979" to be most effective. Zein 3307 is the sodium salt of a protein fraction derived from corn. Zein may be extracted from gluten meal with 85% isopropyl alcohol. The isopropyl extract is then clarified, extracted with hexane, and the zein precipitated from the hexane solution with water. Protovac PV8979 is the sodium salt of a protein derived from casein.

The caustic present may be any alkali metal hydroxide and varies in amount from one to one and one-half mols per mol of hydroxynaphthoic anilide in solution. Usually the caustic will be sodium or potassium hydroxide. In addition to the water, two other solvents are usually present—a monohydric alcohol of less than three carbons and ethylene glycol. At least 5% ethylene glycol is present in our composition. The total weight of ethylene glycol or ethylene glycol and alcohol may vary from 20% to 50% of the total composition. The alcohol present in our composition is related to the caustic present. We prefer, for hydroxynaphthoic anilide, to use methanol with sodium hydroxide, and ethanol if potassium hydroxide is substituted for sodium hydroxide. The variation of the ingredients is complex and is most easily described by reference to the figures, from which the necessary data can be extracted. With other naphthols, the preferred alcohol and caustic varies, as described below.

Figure 19:
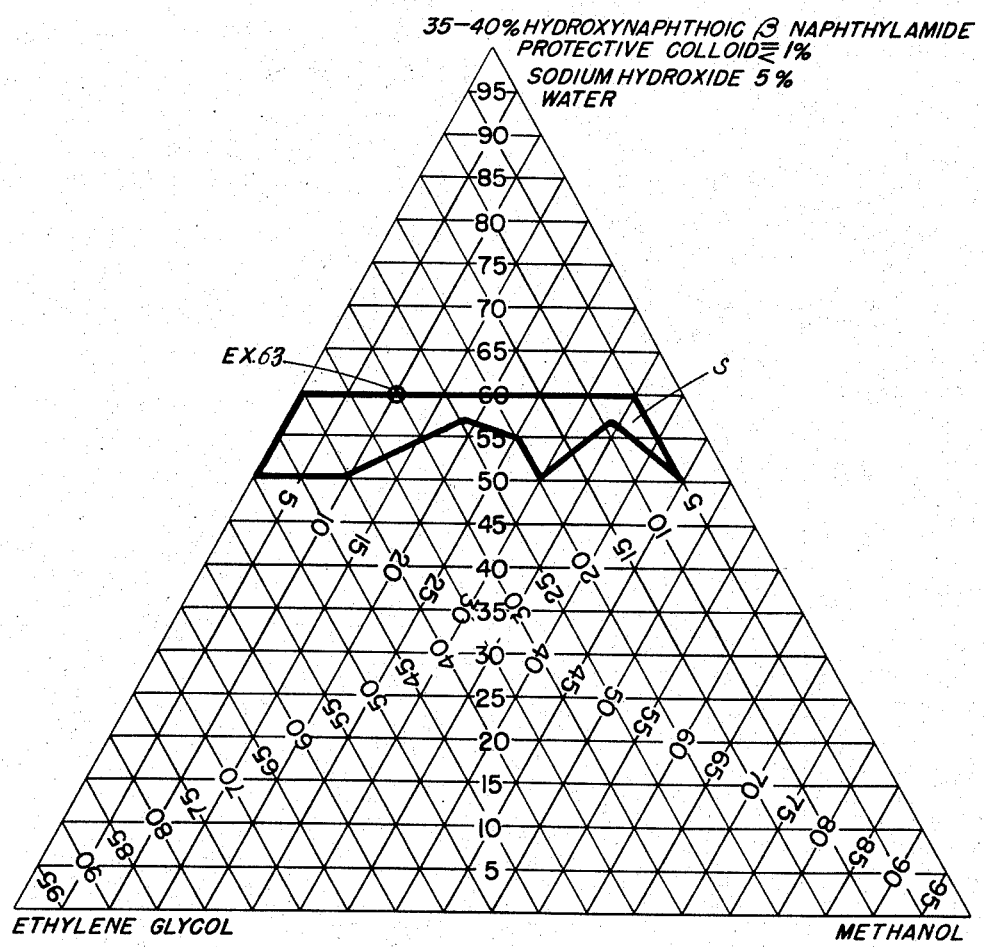
Figure 20:
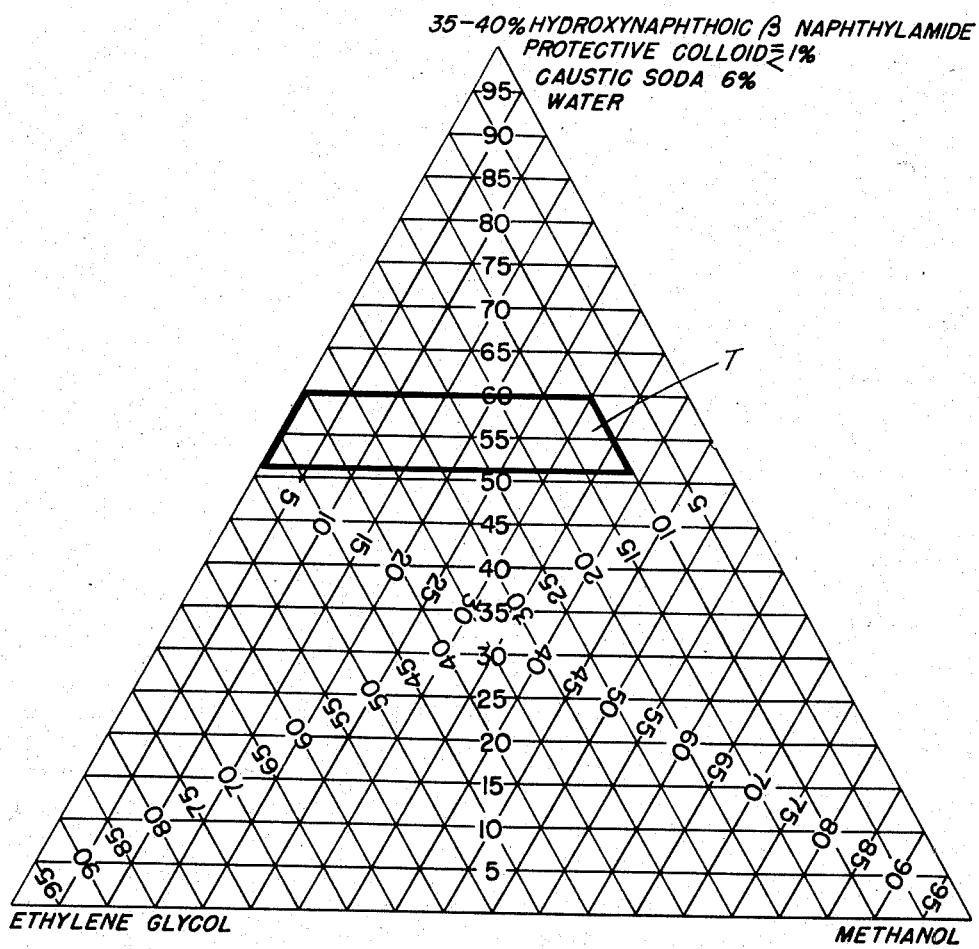

In the attached drawings, Figures 1 through 4, inclusive, illustrate the proportions of the five different ingredients which may be combined to form stable solutions of hydroxynaphthoic anilide (naphthol AS), Figures 5 through 8, inclusive, illustrate the proportions of the five ingredients which give stable solutions of hydroxynaphthoic-m-nitranilide (naphthol ASBS);

Figures 9 through 13, inclusive, illustrate the proportions giving stable solutions of hydroxynaphthoic-o-toluidide (naphthol ASD);

Figures 14 through 18, inclusive, illustrate the proportions giving stable solutions of hydroxynaphthoic-o-anisidide (naphthol ASOL);

Figures 19 and 20 show the proportions giving stable solutions of hydroxynaphthoic-β-naphthylamide (naphthol ASSW);

Figures 21 through 28, inclusive, show the proportions giving stable solutions of hydroxynaphthoic-o-phenetidide (naphthol ASPN); and Figures 29 through 36, inclusive, show the proportions giving stable solutions of naphthol ASG.

The figures are three-phase diagrams. Since the total number of variables exceeds three, it has been expedient to group together four of the variables. In this figure, as in the subsequent figures, all the variables except the two organic solvents are grouped at the apex of the triangular figure. As in all three-phase diagrams, the percentage of any ingredient show at one corner of the triangle is indicated by the distance of the point from the side opposite that corner in the direction of that corner. This percentage can be read from a series of numbered lines calibrating the distance. Within each figure an area has been delimited showing stable solutions. The composition of any point within such areas is determined as follows. The naphthol and the percent of it to be used are selected. The percent usage of caustic is likewise predetermined, depending on the figure. To the sum of these predetermined usages are added the indicated usages of solvents, as read from the figure. The balance needed to make up 100% is water, except for the 1% of protective colloid, if such is used. Compositions falling within the designated areas of the figures have good storage characteristics.

Figures 1 through 4, inclusive, illustrate stable compositions all of which contain from 35 to 40 parts of hydroxynaphthoic anilide.

Figure 1 illustrates compositions containing 35 to 40 parts of hydroxynaphthoic anilide and 6 parts caustic soda. Since both the hydroxynaphthoic anilide and the caustic soda are fixed, there are only four variables, all of which can be represented on triangular coordinate paper by combining two of the variables. The combination of water and protective colloid at one apex of the triangle does not seriously affect the accuracy of this phase diagram, as the total amount of protective colloid is always small. Compositions falling within area A of Fig. 1 were stable for more than six months.

Figure 2:
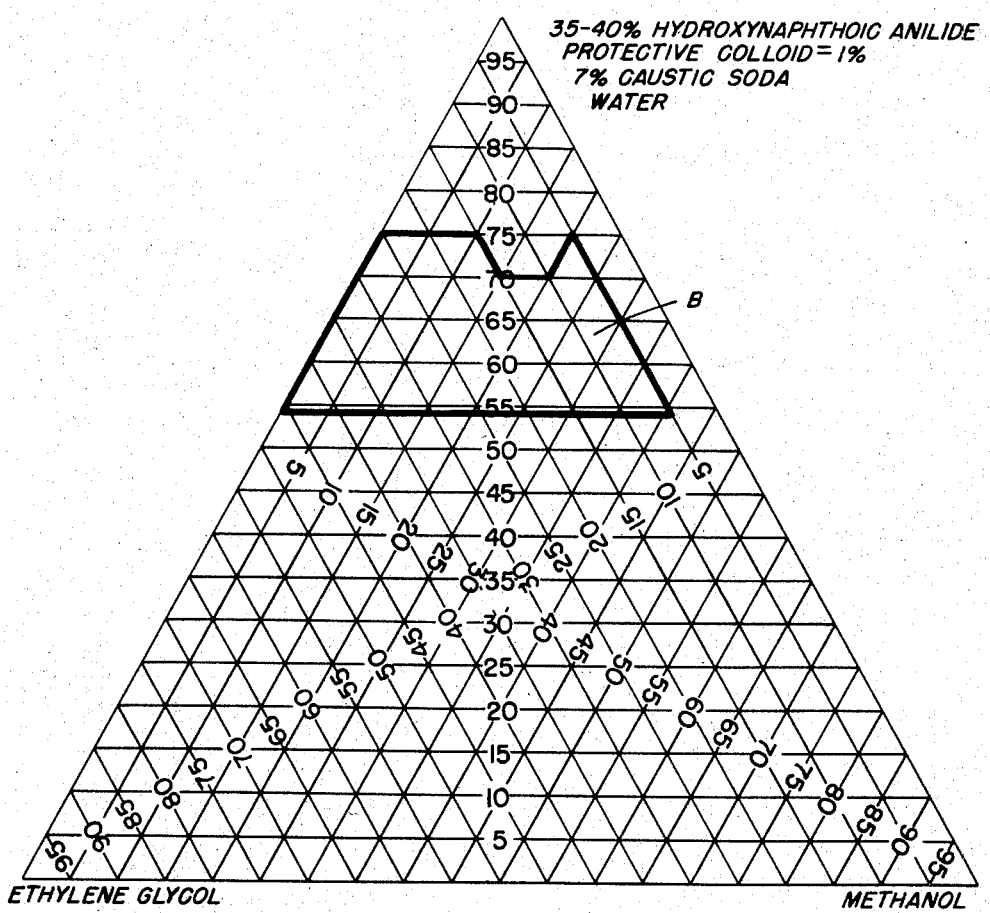

Figure 2 illustrates compositions containing 7 parts caustic soda and 35 to 40 parts of the naphthoic anilide. Compositions falling within area B of Fig. 3 were stable on storage for six months.

Figure 3:
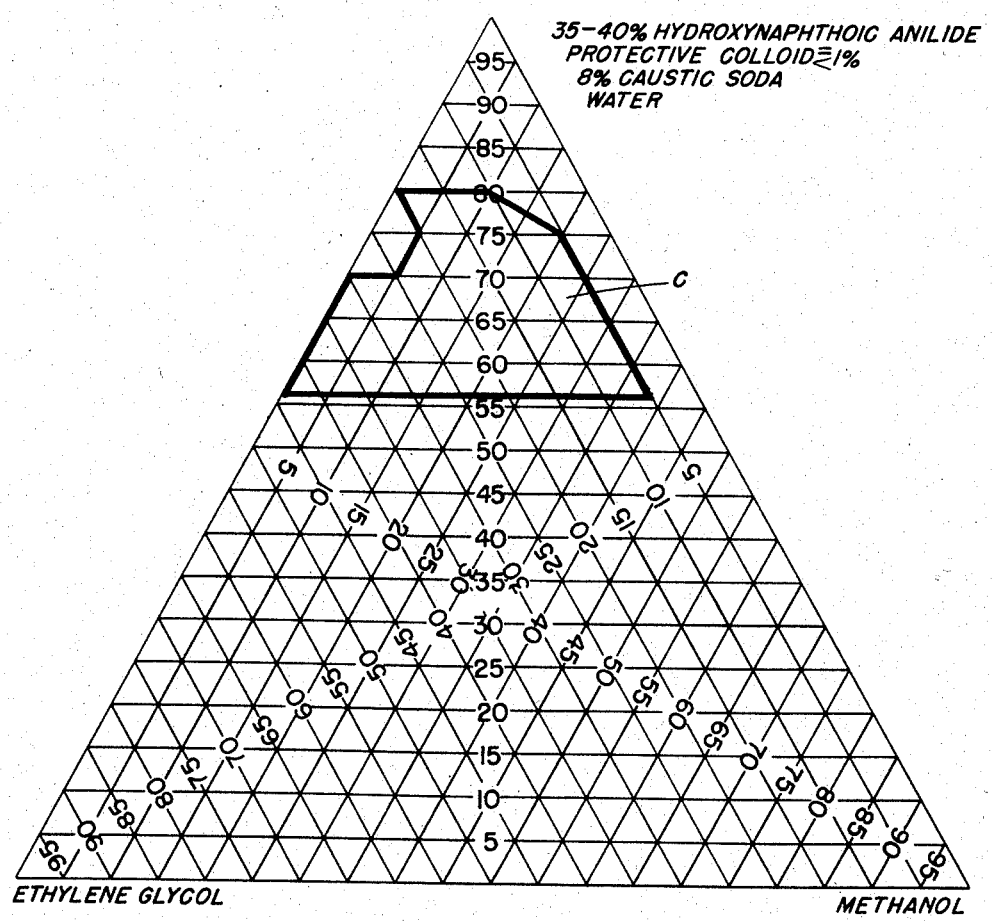

In Figure 3, area C represents stable compositions containing 35 to 40 parts hydroxynaphthoic anilide and 8 parts caustic soda.

Figure 4:
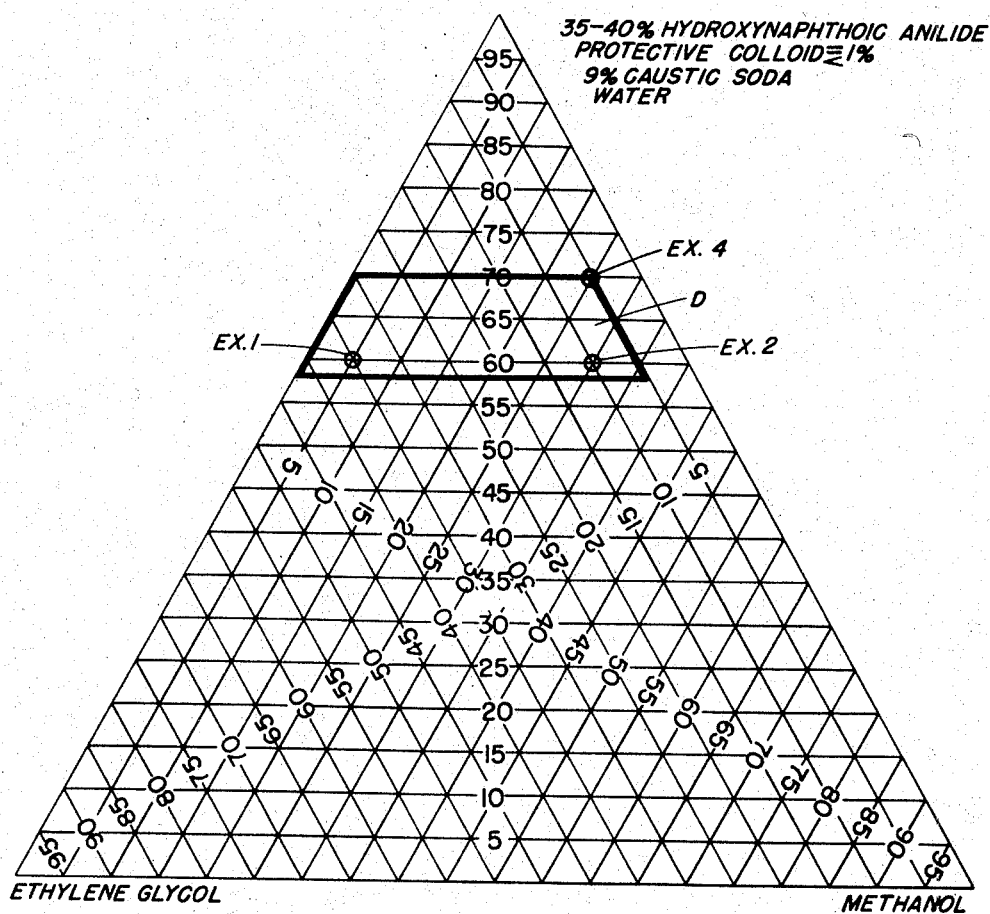

In Figure 4, the amount of caustic soda is increased to 9% and the number of possible stable compositions is smaller, as illustrated by area D. In Figure 4, specific points are identified as being the compositions of specific examples given below.

Figures 5 through 8 illustrate the proportions of the different ingredients which may be combined to form stable solutions of naphthol ASBS. These solutions may contain, in addition to water, hydroxynaphthoic-m-nitranilide, a monohydric aliphatic alcohol, of less than three carbons, ethylene glycol, and an alkali metal hydroxide. Compositions falling within the area E of Fig. 5, have good storage characteristics. In compositions containing 20% hydroxynaphthoic-m-nitranilide, the caustic soda content may be varied from 3 to 6%. Areas F, G, and H on Figures 6, 7, and 8, respectively, show stable compositions having increasing caustic.

Figures 9 through 13 illustrate the proportions of the different ingredients which may be combined to form stable solutions of Naphthol ASD. These solutions may contain in addition to water, hydroxynaphthoic-o-toluidide, an alcohol, ethylene glycol and caustic.

The caustic present is preferably potassium hydroxide and varies in amount from 8.1% to 11.7% for 35–40% solutions of hydroxynaphthoic-o-toluidide.

Compositions in areas I, J, K, L and M of these figures give stable solutions of Naphthol ASD.

The attached drawings, Figures 14, 15, 16, 17 and 18 illustrate the proportions of the different ingredients which may be combined to form stable solutions of Naphthol ASOL. These solutions may contain, in addition to hydroxynaphthoic-o-aniside, water, a monohydric aliphatic alcohol, of less than three carbons, ethylene glycol, and an alkali metal hydroxide. Compositions falling within the areas N, O, P, Q and R of Figures 14–18 have good storage characteristics.

The attached drawings, Figures 19 and 20 illustrate the proportions of the different ingredients which may be combined to form stable solutions of Naphthol ASSW. These solutions may contain, in addition to water, hydroxynaphthoic-β-naphthylamide, an alcohol, ethylene glycol, an alkali metal hydroxide, and a protective colloid. In Figure 19, area S shows stable compositions containing 5% caustic and in Figure 20, area S shows those with 6% caustic. We prefer to use methanol with sodium hydroxide, and ethanol if potassium hydroxide is substituted for sodium hydroxide.

The attached drawings, Figures 21, 22, 23, 24, 25, 26, 27 and 28 illustrate the proportions of the different ingredients which may be combined to form stable solutions of Naphthol ASPN. These solutions may contain, in addition to water, hydroxynaphthoic-o-phenetidide, an alcohol, ethylene glycol and alkali metal hydroxide. In preparing 35–40% hydroxynaphthoic-o-phenetidide solutions, the caustic soda content may be varied between 5% and 12%, i.e., between 1.0 and 2.6 mols per mol of hydroxynaphthoic-o-phenetidide, as shown in areas U–Z and AA and BB in Figures 21–28.

The attached drawings, Figures 29, 30, 31, 32, 33, 34, 35 and 36 illustrate the proportions of the different ingredients which may be combined to form stable solutions of Naphthol ASG. These solutions may contain, in addition to Naphthol ASG, water, an alcohol, ethylene glycol, and an alkali metal hydroxide. In preparing 20% solutions of Naphthol ASG, the caustic soda content may be varied between 4% and 11%, i.e., from 2.3 to 4.8 mols per mol of Naphthol ASG. These compositions are shown in areas CC, DD, EE, FF, GG, HH, II, and JJ.

When potassium hydroxide is used in place of sodium hydroxide, in any of these solutions, a stoichiometric equivalent amount is needed. Since potassium hydroxide weighs more than sodium hydroxide, the percent usage will be 56/40 of the caustic soda usage shown in the figures. Thus, to get an equivalent to the 9% sodium hydroxide usage in Fig. 4, one must use 12.6% potassium hydroxide. Similarly, where Figures 9-13 show 8.1%-11.7% potassium hydroxide as the preferred caustic, usages of sodium hydroxide must be scaled down to 40/56 that of the given KOH usage. These adjustments are balanced by compensating adjustments in the water usage.

The compositions of our invention will be further illustrated by the following examples in which the parts are by weight.

*Example 1*

| | |
|---|---|
| Hydroxynaphthoic anilide | 38.9 |
| Caustic soda | 9.0 |
| Ethylene glycol | 35.0 |
| Methyl alcohol | 5.0 |
| Protective colloid | 1.0 |
| Water | 11.1 |
| | 100.0 |

This composition is that of the point identified in Figure 4 as Example 1. It can be determined from the figure, as has been described previously, by first selecting 38.9% hydroxynaphthoic anilide and 9% caustic soda as the amounts to be used. Any point in area A can have these usages. To secure a non-evaporating solution, a point high in glycol is selected. It can be read from Figure 4 that the point marked Example 1 corresponds to a composition of 35% glycol and 5% methanol. The sum of these four components is 87.9%. Use of 1% protective colloid leaves a balance of 11.1% which must be water.

*Example 2*

| | |
|---|---|
| Hydroxynaphthoic anilide | 38.8 |
| Caustic soda | 9.0 |
| Ethylene glycol | 10.0 |
| Methanol | 30.0 |
| Protective colloid | 1.0 |
| Water | 11.2 |
| | 100.0 |

This composition corresponds to the point on Figure 4 identified as Example 2 and is obtained from the drawings in a manner similar to that described for Example 1.

*Example 3*

| | |
|---|---|
| Hydroxynaphthoic anilide | 38.8 |
| Caustic soda | 9.0 |
| Ethylene glycol | 30.0 |
| Protective colloid | 1.0 |
| Water | 21.2 |
| | 100.0 |

*Example 4*

| | |
|---|---|
| Hydroxynaphthoic anilide | 38.8 |
| Caustic soda | 9.0 |
| Ethylene glycol | 5.0 |
| Methanol | 25.0 |
| Protective colloid | 1.0 |
| Water | 21.2 |
| | 100.0 |

This composition corresponds to the point on Figure 4 labeled Example 3 and is obtained from the drawings in a manner similar to that described for Example 1.

*Example 5*

| | |
|---|---|
| Hydroxynaphthoic anilide | 38.8 |
| Caustic soda | 8.0 |
| Ethylene glycol | 40.0 |
| Protective colloid | 1.0 |
| Water | 12.2 |
| | 100.0 |

*Example 6*

| | |
|---|---|
| Hydroxynaphthoic anilide | 38.8 |
| Caustic soda | 8.0 |
| Ethylene glycol | 5.0 |
| Methanol | 35.0 |
| Protective colloid | 1.0 |
| Water | 12.2 |
| | 100.0 |

*Example 7*

| | |
|---|---|
| Hydroxynaphthoic anilide | 38.8 |
| Caustic soda | 8.0 |
| Ethylene glycol | 5.0 |
| Methanol | 20.0 |
| Protective colloid | 1.0 |
| Water | 27.2 |
| | 100.0 |

*Example 8*

| | |
|---|---|
| Hydroxynaphthoic anilide | 38.8 |
| Caustic soda | 7.0 |
| Ethylene glycol | 46.0 |
| Protective colloid | 1.0 |
| Water | 7.2 |
| | 100.0 |

*Example 9*

| | |
|---|---|
| Hydroxynaphthoic anilide | 38.8 |
| Caustic soda | 7.0 |
| Ethylene glycol | 5.0 |
| Methanol | 41.0 |
| Protective colloid | 1.0 |
| Water | 7.2 |
| | 100.0 |

*Example 10*

| | |
|---|---|
| Hydroxynaphthoic anilide | 38.8 |
| Caustic soda | 7.0 |
| Ethylene glycol | 5.0 |
| Methanol | 20.0 |
| Protective colloid | 1.0 |
| Water | 28.2 |
| | 100.0 |

*Example 11*

| | |
|---|---|
| Hydroxynaphthoic anilide | 38.8 |
| Caustic soda | 6.0 |
| Ethylene glycol | 48.0 |
| Protective colloid | 1.0 |
| Water | 6.2 |
| | 100.0 |

*Example 12*

| | |
|---|---|
| Hydroxynaphthoic anilide | 38.8 |
| Caustic soda | 6.0 |
| Ethylene glycol | 5.0 |
| Methanol | 15.0 |
| Protective colloid | 1.0 |
| Water | 34.2 |
| | 100.0 |

*Example 13*

| | |
|---|---|
| Hydroxynaphthoic anilide | 38.8 |
| Caustic potash | 12.6 |
| Ethylene glycol | 25.0 |
| Methanol | 8.5 |
| Water | 15.1 |
| | 100.0 |

Example 14

| | |
|---|---|
| Hydroxynaphthoic anilide | 38.8 |
| Caustic potash | 11.7 |
| Ethylene glycol | 20.0 |
| Methanol | 10.0 |
| Water | 19.5 |
| | 100.0 |

Example 15

| | |
|---|---|
| Hydroxynaphthoic-m-nitranilide | 20.0 |
| NaOH | 3.0 |
| Ethylene glycol | 45.0 |
| Methanol | 20.0 |
| Water | 12.0 |
| | 100.0 |

Figure 5:
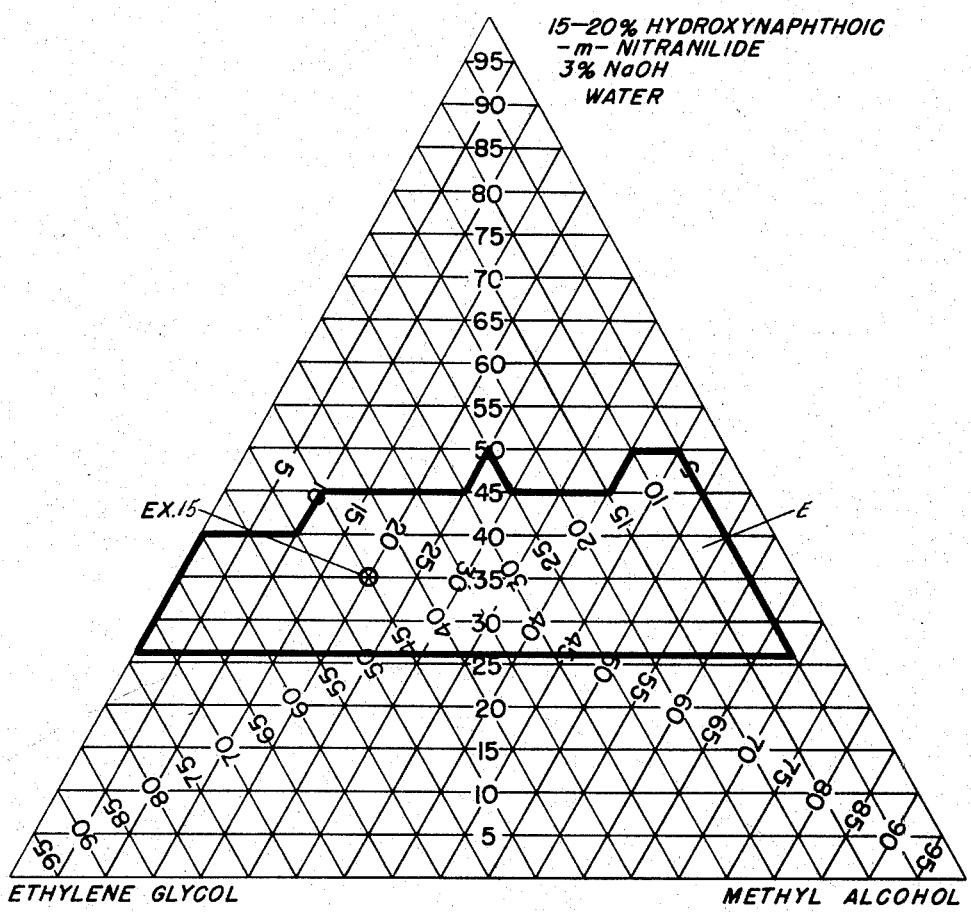
Figure 6:
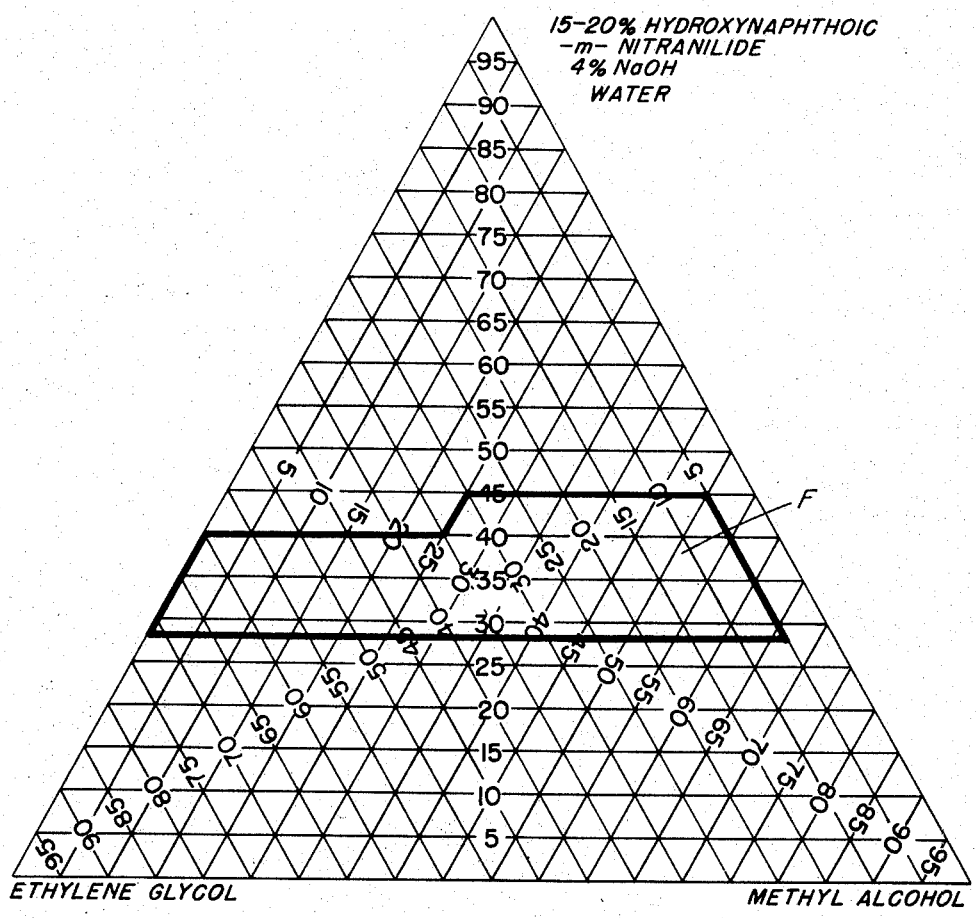
Figure 7:
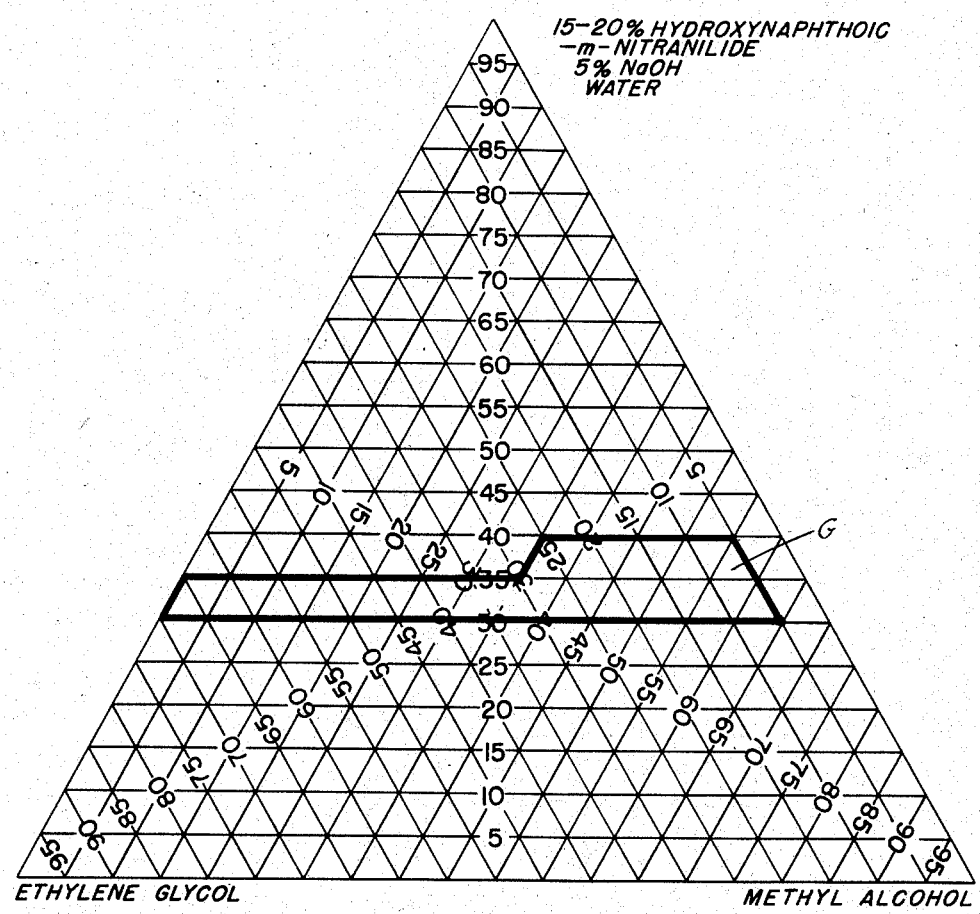
Figure 8:
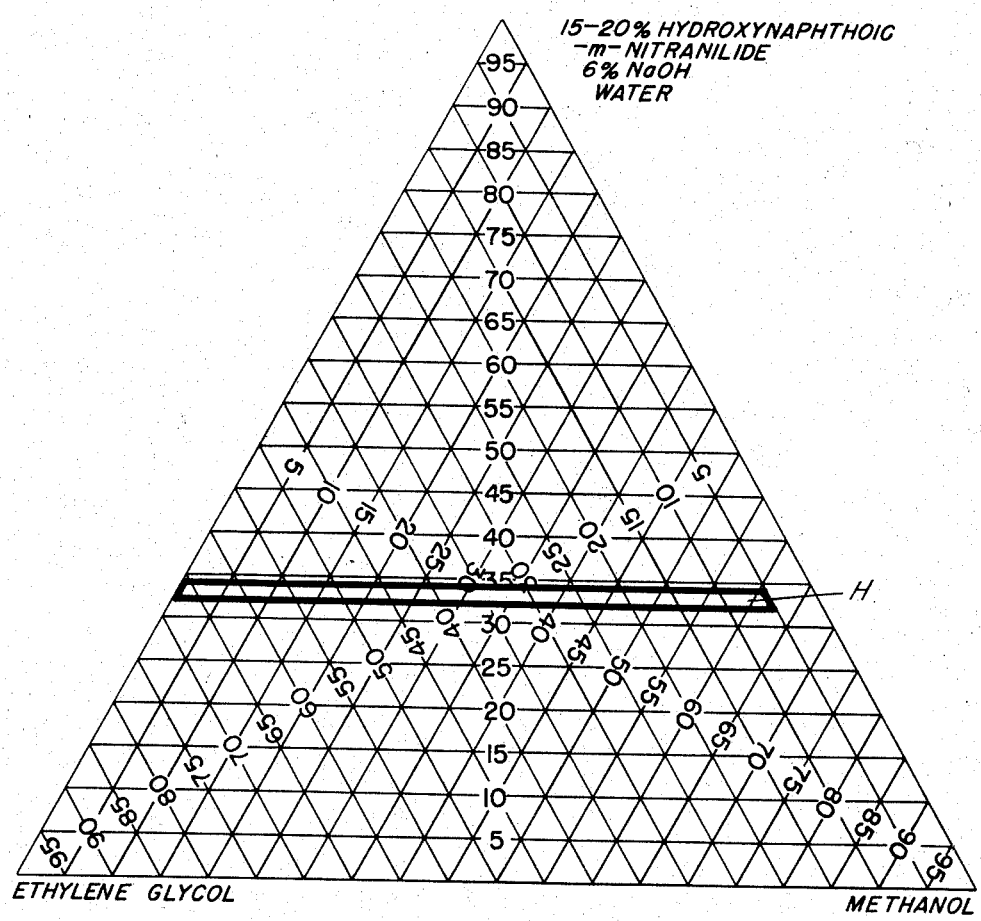

The composition is that of the point identified in Figure 5 as Example 15. It can be determined from the figure as has been described previously, by first selecting 20% hydroxynaphthoic-m-nitranilide and 3% caustic soda as the amounts to be used. Any point in area E can have these usages and be stable. It can be read from Figure 5 that the point marked Example 15 corresponds to a composition of 45% glycol and 20% methanol. The sum of these four components is 88%. The balance of 12% must be water.

Example 16

| | |
|---|---|
| Hydroxynaphthoic-m-nitranilide | 20.0 |
| NaOH | 3.0 |
| Ethylene glycol | 20.0 |
| Methyl alcohol | 45.0 |
| Water | 12.0 |
| | 100.0 |

Example 17

| | |
|---|---|
| Hydroxynaphthoic-m-nitranilide | 20.0 |
| NaOH | 4.0 |
| Ethylene glycol | 70.0 |
| Water | 6.0 |
| | 100.0 |

Example 18

| | |
|---|---|
| Hydroxynaphthoic-m-nitranilide | 20.0 |
| NaOH | 4.0 |
| Ethylene glycol | 30.0 |
| Methyl alcohol | 40.0 |
| Water | 6.0 |
| | 100.0 |

Example 19

| | |
|---|---|
| Hydroxynaphthoic-m-nitranilide | 20.0 |
| NaOH | 4.0 |
| Ethylene glycol | 20.0 |
| Methyl alcohol | 50.0 |
| Water | 6.0 |
| | 100.0 |

Example 20

| | |
|---|---|
| Hydroxynaphthoic-m-nitranilide | 20.0 |
| NaOH | 5.0 |
| Ethylene glycol | 70.0 |
| Water | 5.0 |
| | 100.0 |

Example 21

| | |
|---|---|
| Hydroxynaphthoic-m-nitranilide | 20.0 |
| NaOH | 5.0 |
| Ethylene glycol | 10.0 |
| Methyl alcohol | 60.0 |
| Water | 5.0 |
| | 100.0 |

Example 22

| | |
|---|---|
| Hydroxynaphthoic-m-nitranilide | 20.0 |
| NaOH | 6.0 |
| Ethylene glycol | 67.0 |
| Water | 7.0 |
| | 100.0 |

Example 23

| | |
|---|---|
| Hydroxynaphthoic-m-nitranilide | 20.0 |
| NaOH | 6.0 |
| Ethylene glycol | 20.0 |
| Methyl alcohol | 47.0 |
| Water | 7.0 |
| | 100.0 |

Example 24

| | |
|---|---|
| Hydroxynaphthoic-m-nitranilide | 20.0 |
| NaOH | 3.0 |
| Ethylene glycol | 15.0 |
| Ethyl alcohol | 50.0 |
| Water | 12.0 |
| | 100.0 |

Example 25

| | |
|---|---|
| Hydroxynaphthoic-m-nitranilide | 20.0 |
| NaOH | 3.0 |
| Ethylene glycol | 15.0 |
| Ethyl alcohol | 55.0 |
| Water | 7.0 |
| | 100.0 |

Example 26

| | |
|---|---|
| Hydroxynaphthoic-m-nitranilide | 20.0 |
| KOH | 4.3 |
| Ethylene glycol | 15.0 |
| Methyl alcohol | 55.0 |
| Water | 5.7 |
| | 100.0 |

Example 27

| | |
|---|---|
| Hydroxynaphthoic-m-nitranilide | 20.0 |
| KOH | 4.3 |
| Ethylene glycol | 55.0 |
| Methyl alcohol | 15.0 |
| Water | 5.7 |
| | 100.0 |

Example 28

| | |
|---|---|
| Hydroxynaphthoic-m-nitranilide | 20.0 |
| KOH | 4.3 |
| Ethylene glycol | 15.0 |
| Ethyl alcohol | 50.0 |
| Water | 10.7 |
| | 100.0 |

Example 29

| | |
|---|---|
| Hydroxynaphthoic-m-nitranilide | 20.0 |
| KOH | 4.3 |
| Ethylene glycol | 55.0 |
| Ethyl alcohol | 15.0 |
| Water | 5.7 |
| | 100.0 |

Example 30

| | |
|---|---|
| Hydroxynaphthoic-o-toluidide | 40.0 |
| Potassium hydroxide | 8.1 |
| Ethylene glycol | 15.0 |
| Methyl alcohol | 10.0 |
| Water | 26.9 |
| | 100.0 |

Example 31

| | |
|---|---|
| Hydroxynaphthoic-o-toluidide | 40.0 |
| Potassium hydroxide | 8.1 |
| Ethylene glycol | 10.0 |
| Methyl alcohol | 15.0 |
| Water | 26.9 |
| | 100.0 |

Figure 9:
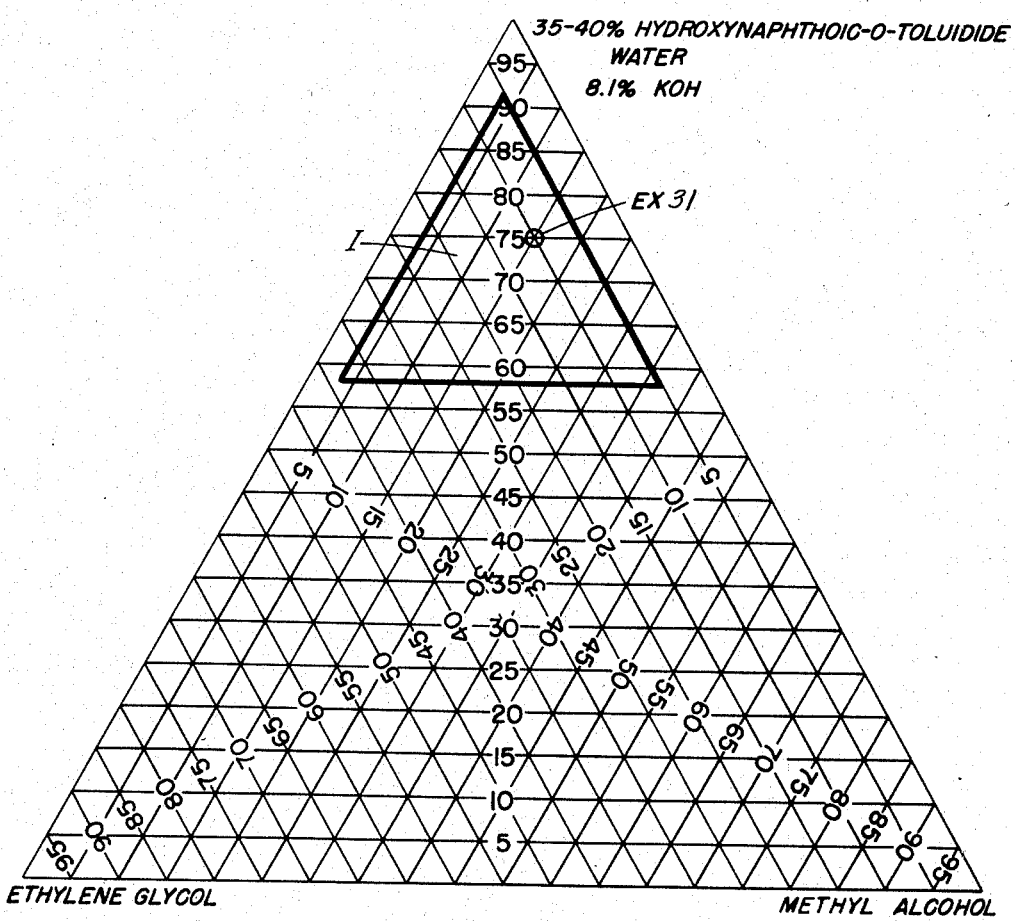
Figure 10:
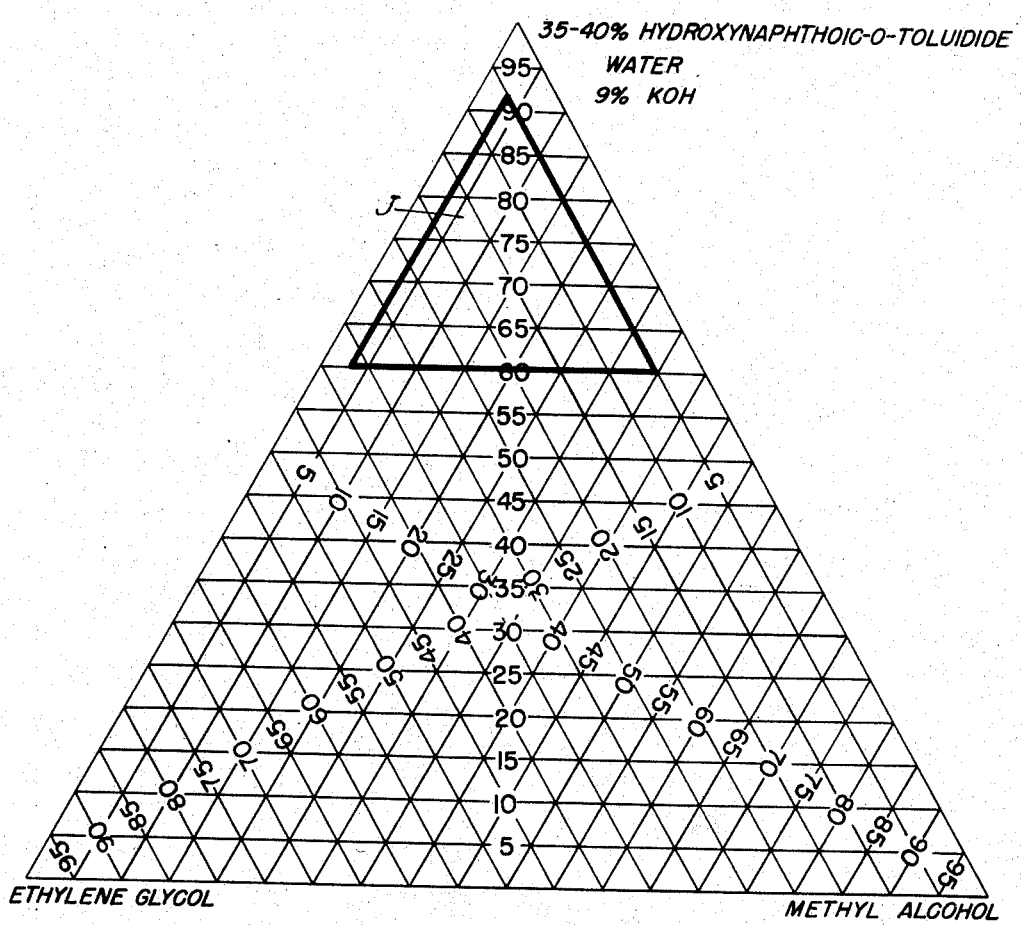
Figure 11:
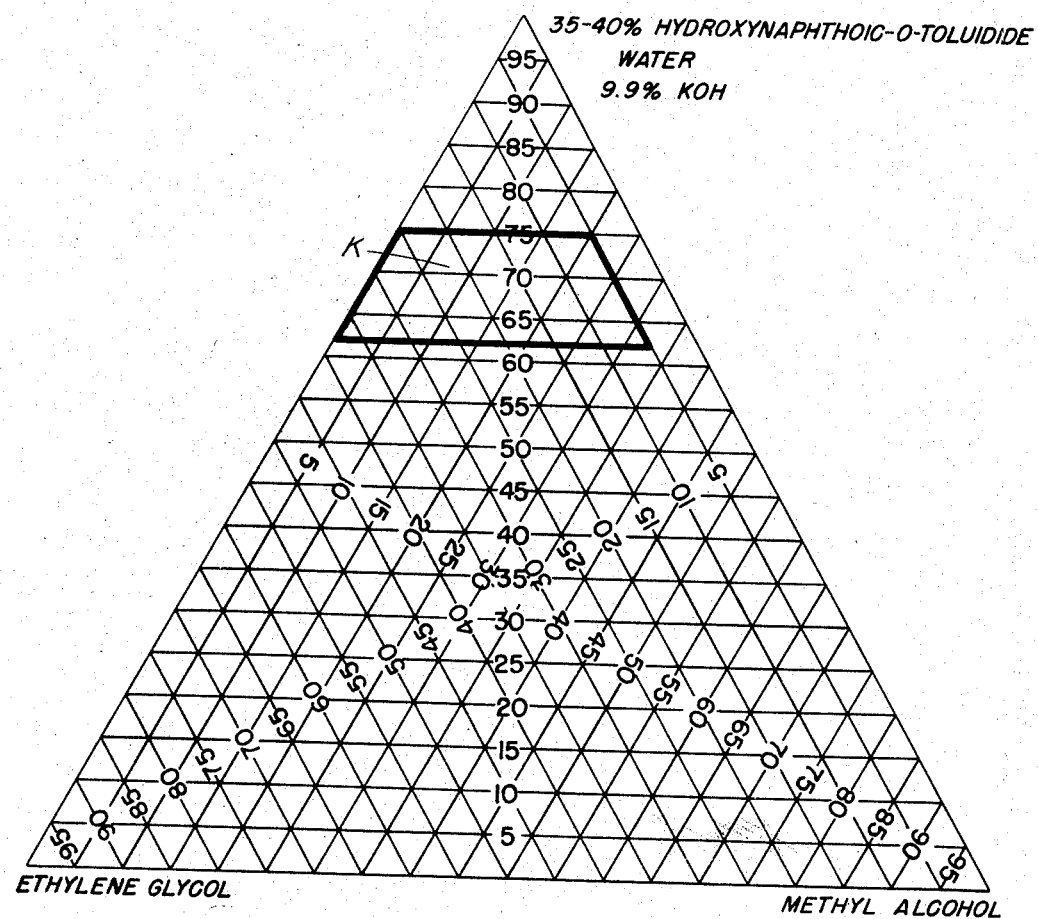
Figure 12:
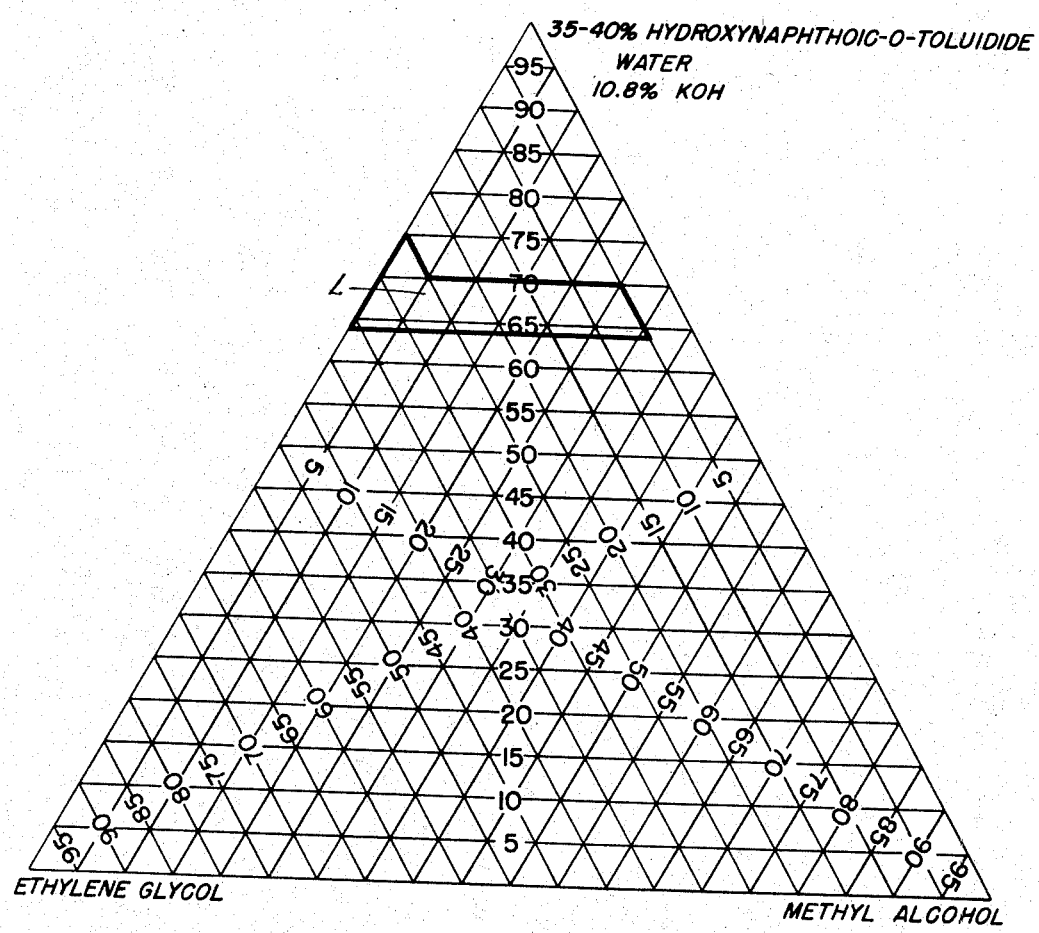
Figure 13:
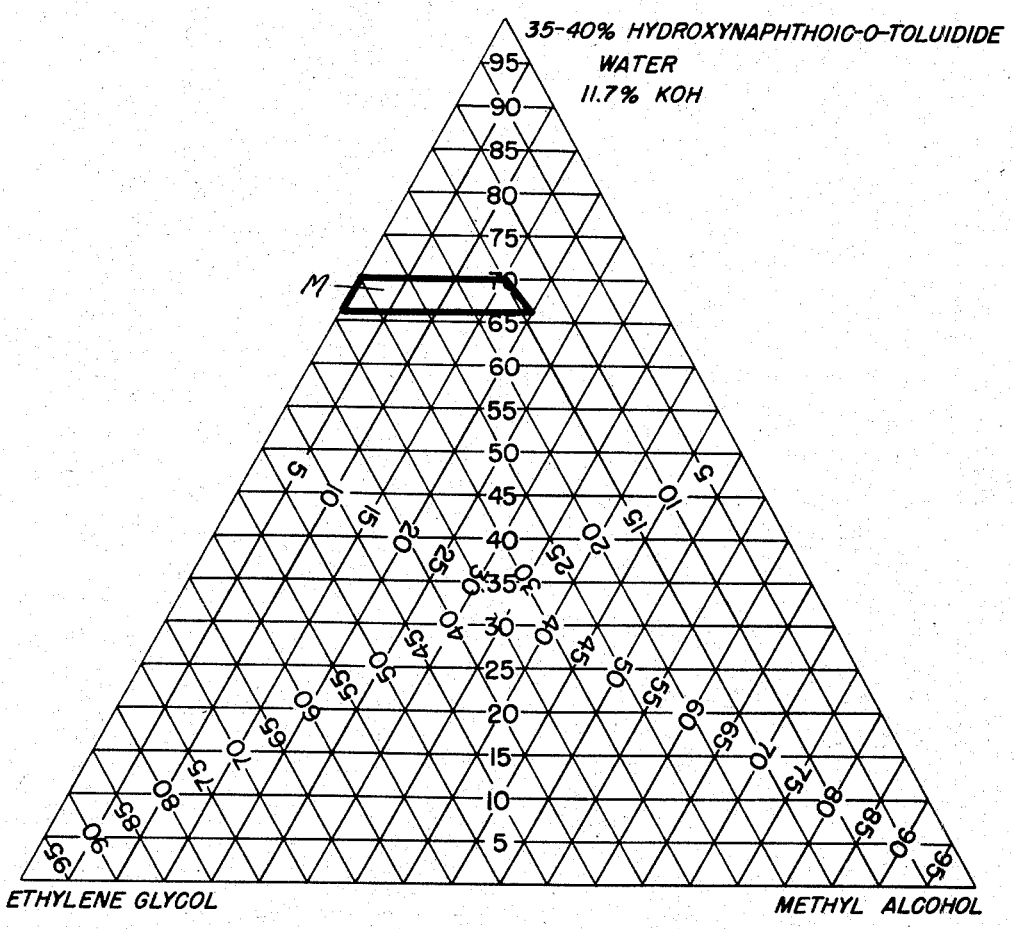

This composition is that of the point identified in Figure 9 as Example 31. It can be determined from the figure, as has been described previously, by first selecting 40% hydroxynaphthoic toluidide and 8.1% potassium hydroxide as the amounts to be used. Any point in Figure 9 may have these usages, but only those within area I will be stable. It can be seen from Figure 9 that the point marked Example 31 corresponds to 10% glycol and 15% methyl alcohol. The sum of the four components thus far determined is 73.1%. The balance, or 26.9%, is water.

Example 32

| | |
|---|---|
| Hydroxynaphthoic-o-toluidide | 40.0 |
| Potassium hydroxide | 9.0 |
| Ethylene glycol | 15.0 |
| Methyl alcohol | 5.0 |
| Water | 13.0 |
| | 100.0 |

Example 33

| | |
|---|---|
| Hydroxynaphthoic-o-toluidide | 40.0 |
| Potassium hydroxide | 9.0 |
| Ethylene glycol | 5.0 |
| Methyl alcohol | 10.0 |
| Water | 36.0 |
| | 100.0 |

Example 34

| | |
|---|---|
| Hydroxynaphthoic-o-toluidide | 40.0 |
| Potassium hydroxide | 9.9 |
| Ethylene glycol | 30.0 |
| Water | 20.1 |
| | 100.0 |

Example 35

| | |
|---|---|
| Hydroxynaphthoic-o-toluidide | 40.0 |
| Potassium hydroxide | 9.9 |
| Ethylene glycol | 10.0 |
| Methyl alcohol | 20.0 |
| Water | 20.1 |
| | 100.0 |

Example 36

| | |
|---|---|
| Hydroxynaphthoic-o-toluidide | 40.0 |
| Potassium hydroxide | 10.8 |
| Ethylene glycol | 35.0 |
| Water | 14.2 |
| | 100.0 |

Example 37

| | |
|---|---|
| Hydroxynaphthoic-o-toluidide | 40.0 |
| Potassium hydroxide | 10.8 |
| Ethylene glycol | 10.0 |
| Methyl alcohol | 25.0 |
| Water | 14.2 |
| | 100.0 |

Example 38

| | |
|---|---|
| Hydroxynaphthoic-o-toluidide | 40.0 |
| Potassium hydroxide | 11.7 |
| Ethylene glycol | 30.0 |
| Water | 18.3 |
| | 100.0 |

Example 39

| | |
|---|---|
| Hydroxynaphthoic-o-toluidide | 40.0 |
| Potassium hydroxide | 11.7 |
| Ethylene glycol | 20.0 |
| Methyl alcohol | 10.0 |
| Water | 18.3 |
| | 100.0 |

Example 40

| | |
|---|---|
| Hydroxynaphthoic-o-toluidide | 40.0 |
| Potassium hydroxide | 8.1 |
| Ethylene glycol | 10.0 |
| Ethyl alcohol | 20.0 |
| Water | 21.9 |
| | 100.0 |

Example 41

| | |
|---|---|
| Hydroxynaphthoic-o-toluidide | 40.0 |
| Potassium hydroxide | 9.0 |
| Ethylene glycol | 15.0 |
| Ethyl alcohol | 10.0 |
| Water | 26.0 |
| | 100.0 |

Example 42

| | |
|---|---|
| Hydroxynaphthoic-o-anisidide | 40.0 |
| NaOH | 5.0 |
| Ethylene glycol | 25.0 |
| Methanol | 10.0 |
| Water | 20.0 |
| | 100.0 |

Figure 14:
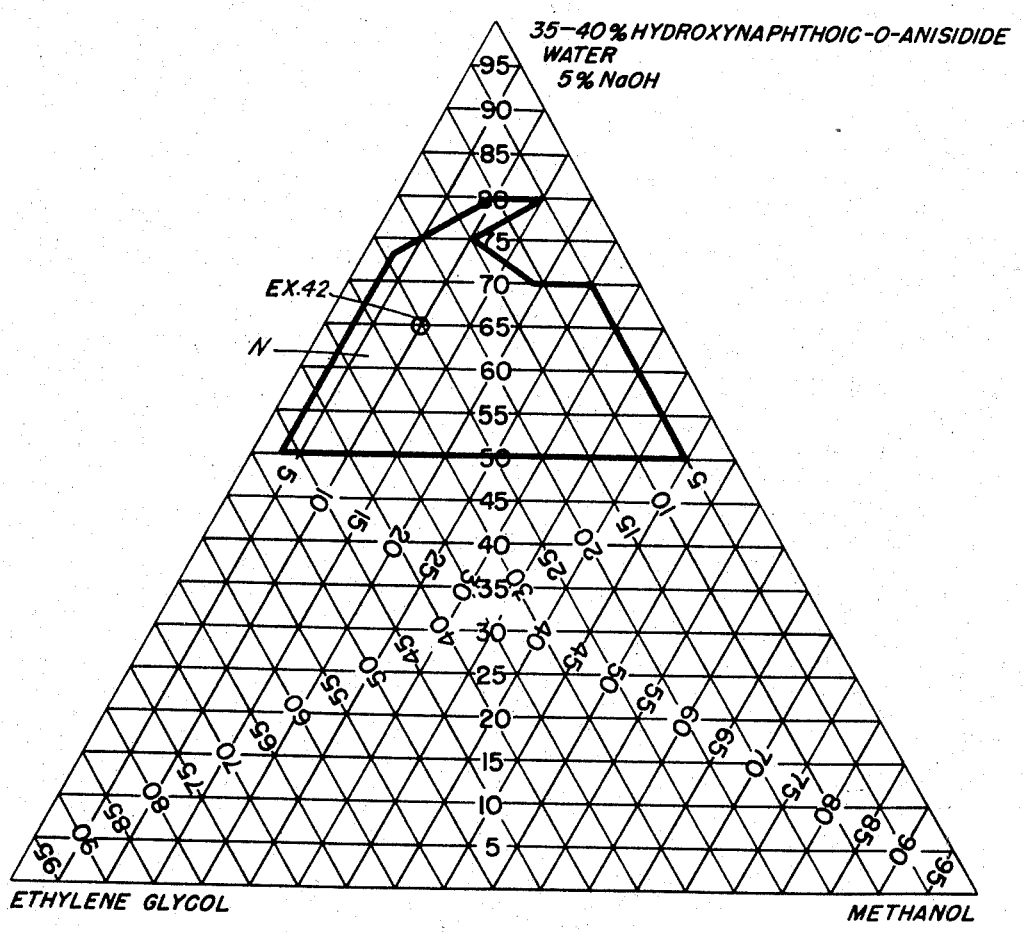
Figure 15:
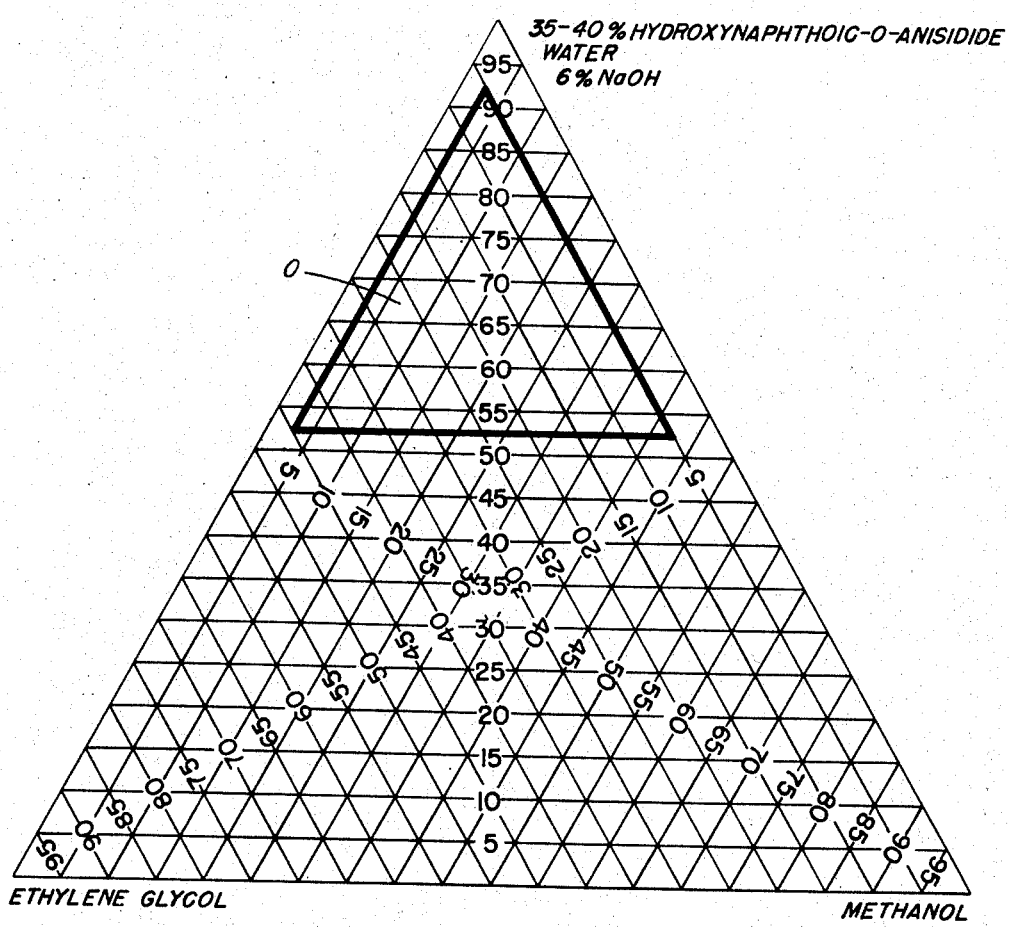
Figure 16:
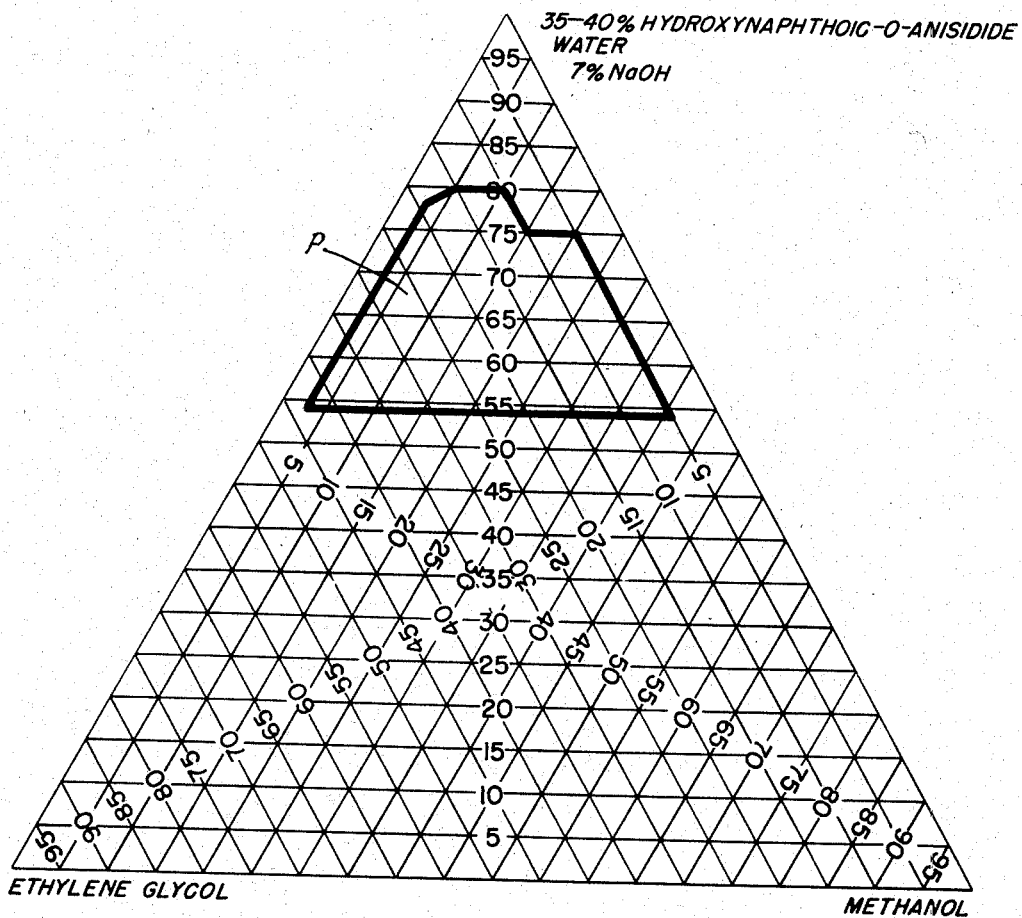
Figure 17:
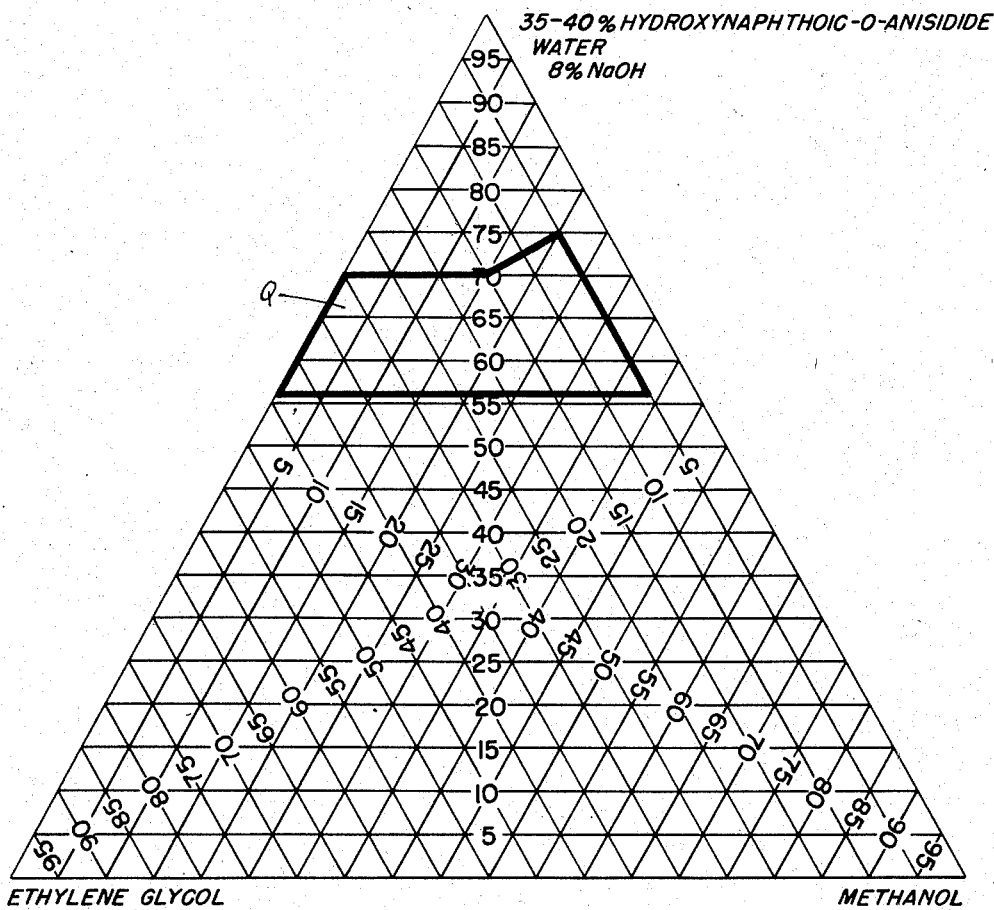
Figure 18:
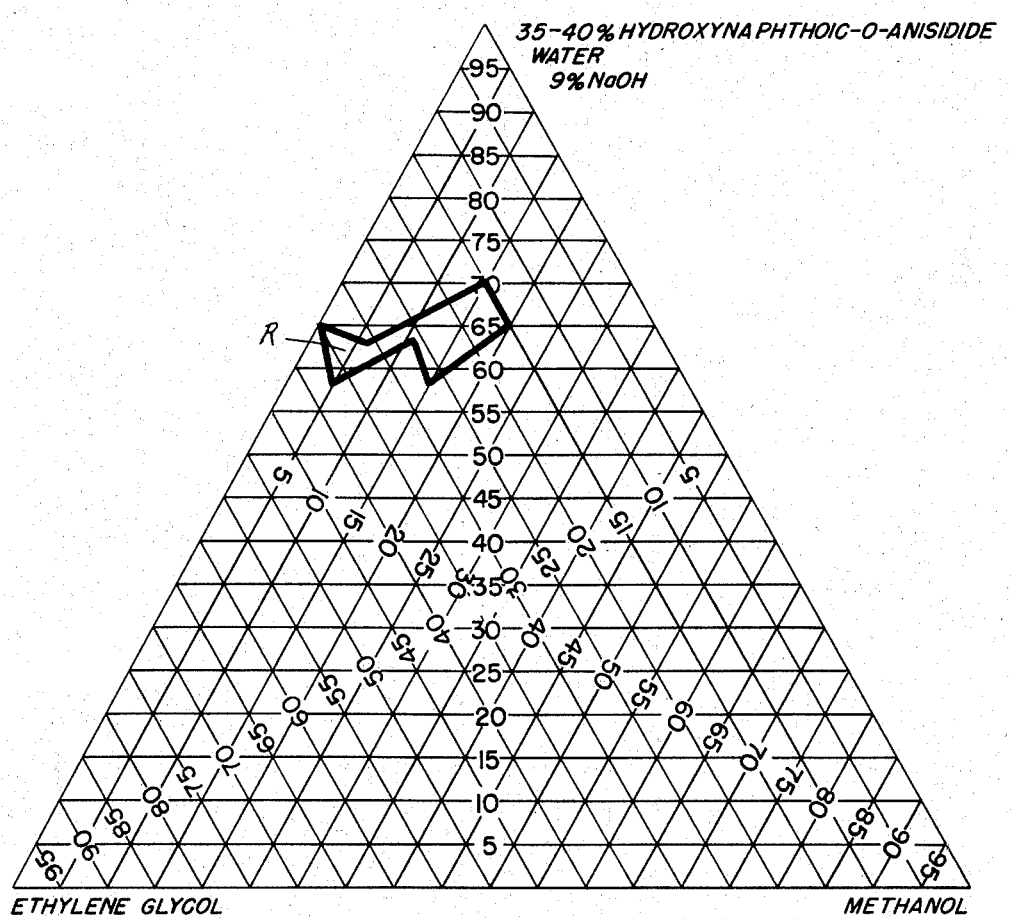

This composition is that of the point identified in Figure 14 as Example 42. It can be determined from the figure as has been described previously, by first selecting 40% hydroxynaphthoic-o-anisidide and 5% caustic soda as the amounts to be used. Any point in area N can have the usages and be stable. It can be read from Figure 14 that the point marked Example 42 corresponds to a composition of 25% glycol and 10% methanol. The balance (20%) is water.

Example 43

| | |
|---|---|
| Hydroxynaphthoic-o-anisidide | 40.0 |
| NaOH | 5.0 |
| Ethylene glycol | 15.0 |
| Methanol | 20.0 |
| Water | 20.0 |
| | 100.0 |

Example 44

| | |
|---|---|
| Hydroxynaphthoic-o-anisidide | 40.0 |
| NaOH | 6.0 |
| Ethylene glycol | 20.0 |
| Methyl alcohol | 10.0 |
| Water | 24.0 |
| | 100.0 |

Example 45

| | |
|---|---|
| Hydroxynaphthoic-o-anisidide | 40.0 |
| NaOH | 6.0 |
| Ethylene glycol | 15.0 |
| Methanol | 5.0 |
| Water | 34.0 |
| | 100.0 |

Example 46

| | |
|---|---|
| Hydroxynaphthoic-o-anisidide | 40.0 |
| NaOH | 7.0 |
| Ethylene glycol | 30.0 |
| Methanol | 10.0 |
| Water | 13.0 |
| | 100.0 |

Example 47

| | |
|---|---|
| Hydroxynaphthoic-o-anisidide | 40.0 |
| NaOH | 7.0 |
| Ethylene glycol | 15.0 |
| Methyl alcohol | 15.0 |
| Water | 23.0 |
| | 100.0 |

Example 48

| | |
|---|---|
| Hydroxynaphthoic-o-anisidide | 40.0 |
| NaOH | 8.0 |
| Ethylene glycol | 35.0 |
| Water | 17.0 |
| | 100.0 |

Example 49

| | |
|---|---|
| Hydroxynaphthoic-o-anisidide | 40.0 |
| NaOH | 8.0 |
| Ethylene glycol | 10.0 |
| Methyl alcohol | 25.0 |
| Water | 17.0 |
| | 100.0 |

Example 50

| | |
|---|---|
| Hydroxynaphthoic-o-anisidide | 40.0 |
| NaOH | 9.0 |
| Ethylene glycol | 35.0 |
| Water | 16.0 |
| | 100.0 |

Example 51

| | |
|---|---|
| Hydroxynaphthoic-o-anisidide | 40.0 |
| NaOH | 9.0 |
| Ethylene glycol | 20.0 |
| Methyl alcohol | 15.0 |
| Water | 16.0 |
| | 100.0 |

Example 52

| | |
|---|---|
| Hydroxynaphthoic-o-anisidide | 40.0 |
| NaOH | 7.0 |
| Ethylene glycol | 20.0 |
| Methyl alcohol | 20.0 |
| Water | 13.0 |
| | 100.0 |

Example 53

| | |
|---|---|
| Hydroxynaphthoic-o-anisidide | 40.0 |
| NaOH | 7.0 |
| Ethylene glycol | 15.0 |
| Ethyl alcohol | 15.0 |
| Water | 18.0 |
| | 100.0 |

Example 54

| | |
|---|---|
| Hydroxynaphthoic-o-anisidide | 40.0 |
| NaOH | 8.0 |
| Ethylene glycol | 15.0 |
| Ethyl alcohol | 20.0 |
| Water | 17.0 |
| | 100.0 |

Example 55

| | |
|---|---|
| Hydroxynaphthoic-o-anisidide | 40.0 |
| KOH | 9.4 |
| Ethylene glycol | 20.0 |
| Methyl alcohol | 15.0 |
| Water | 15.6 |
| | 100.0 |

Example 56

| | |
|---|---|
| Hydroxynaphthoic-o-anisidide | 40.0 |
| KOH | 8.6 |
| Ethylene glycol | 25.0 |
| Methyl alcohol | 10.0 |
| Water | 16.4 |
| | 100.0 |

Example 57

| | |
|---|---|
| Hydroxynaphthoic-o-anisidide | 40.0 |
| KOH | 8.6 |
| Ethylene glycol | 25.0 |
| Ethyl alcohol | 10.0 |
| Water | 16.4 |
| | 100.0 |

Example 58

| | |
|---|---|
| Hydroxynaphthoic-o-anisidide | 40.0 |
| KOH | 8.6 |
| Ethylene glycol | 10.0 |
| Ethyl alcohol | 15.0 |
| Water | 26.4 |
| | 100.0 |

Example 59

| | |
|---|---|
| Hydroxynaphthoic-β-naphthylamide | 38.0 |
| Caustic soda | 5.0 |
| Ethylene glycol | 50.0 |
| Protective colloid | 1.0 |
| Water | 6.0 |
| | 100.0 |

Example 60

| | |
|---|---|
| Hydroxynaphthoic-β-naphthylamide | 38.0 |
| Caustic soda | 5.0 |
| Ethylene glycol | 40.0 |
| Protective colloid | 1.0 |
| Water | 16.0 |
| | 100.0 |

Example 61

| | |
|---|---|
| Hydroxynaphthoic-β-naphthylamide | 38.0 |
| Caustic soda | 6.0 |
| Ethylene glycol | 40.0 |
| Protective colloid | 1.0 |
| Water | 15.0 |
| | 100.0 |

Example 62

| | |
|---|---|
| Hydroxynaphthoic-β-naphthylamide | 38.0 |
| Caustic soda | 6.0 |
| Ethylene glycol | 49.0 |
| Protective colloid | 1.0 |
| Water | 6.0 |
| | 100.0 |

Example 63

| | |
|---|---|
| Hydroxynaphthoic-β-naphthylamide | 38.0 |
| Caustic soda | 5.0 |
| Ethylene glycol | 30.0 |
| Methanol | 10.0 |
| Protective colloid | 1.0 |
| Water | 16.0 |
| | 100.0 |

This composition is that of the point identified in Figure 19 as Example 63. It can be determined from the figure, as has been described previously, by first selecting 38.0% hydroxynaphthoic naphthylamide and 5% caustic soda as the amounts to be used. Any point within area S can have these usages. To secure a non-evaporating solution, a point high in glycol is selected. It can be read from Figure 19 that the point marked Example 63 corresponds to a composition of 30% ethylene glycol and 10% methanol. The sum of these four components is 83.0%. Use of 1% protective colloid leaves a balance of 16% which must be water.

Example 64

| | |
|---|---|
| Hydroxynaphthoic-β-naphthylamide | 38.0 |
| Caustic soda | 6.0 |
| Ethylene glycol | 10.0 |
| Methanol | 30.0 |
| Protective colloid | 1.0 |
| Water | 15.0 |
| | 100.0 |

Example 65

| | |
|---|---|
| Hydroxynaphthoic-β-naphthylamide | 38.0 |
| Caustic soda | 6.0 |
| Ethylene glycol | 30.0 |
| Methanol | 10.0 |
| Protective colloid | 1.0 |
| Water | 15.0 |
| | 100.0 |

Example 66

| | |
|---|---|
| Hydroxynaphthoic-β-naphthylamide | 38.0 |
| Caustic potash | 8.1 |
| Ethylene glycol | 30.0 |
| Methanol | 15.0 |
| Water | 8.9 |
| | 100.0 |

Example 67

| | |
|---|---|
| Hydroxynaphthoic-o-phenetidide | 40.0 |
| NaOH | 5.0 |
| Ethylene glycol | 10.0 |
| Methyl alcohol | 15.0 |
| Water | 30.0 |
| | 100.0 |

Figure 21:
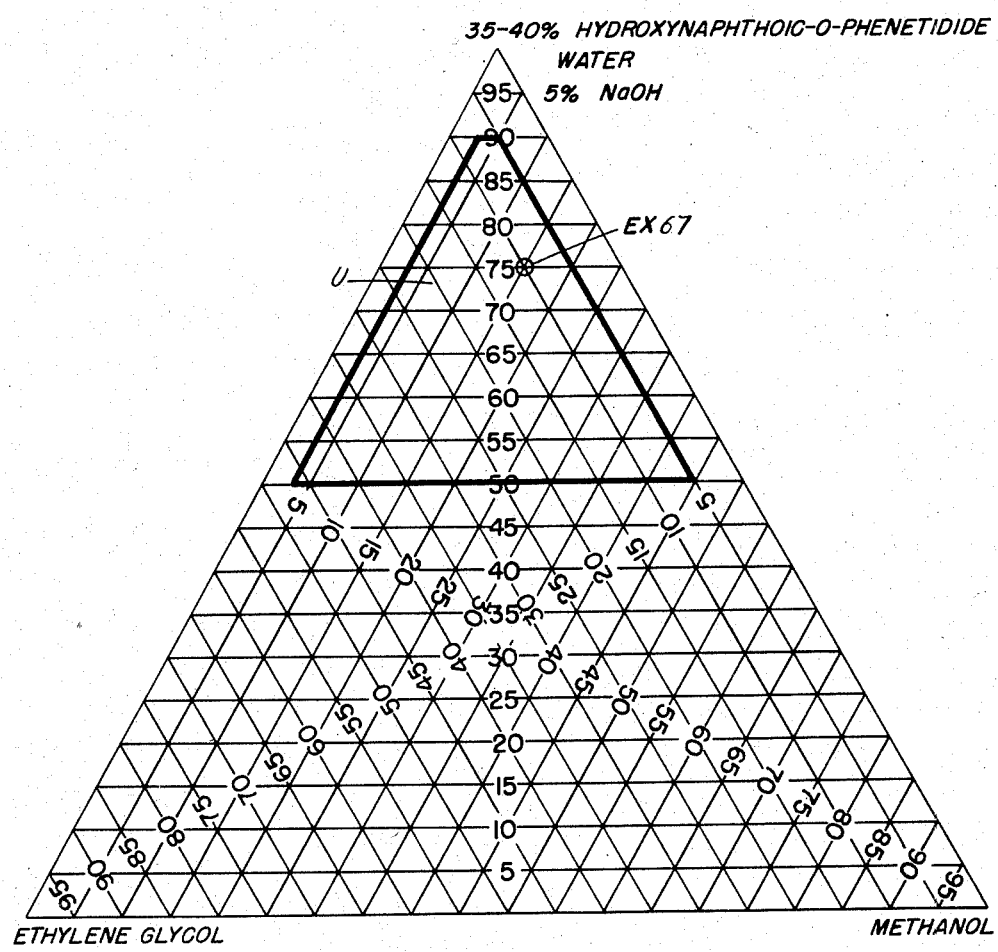
Figure 22:
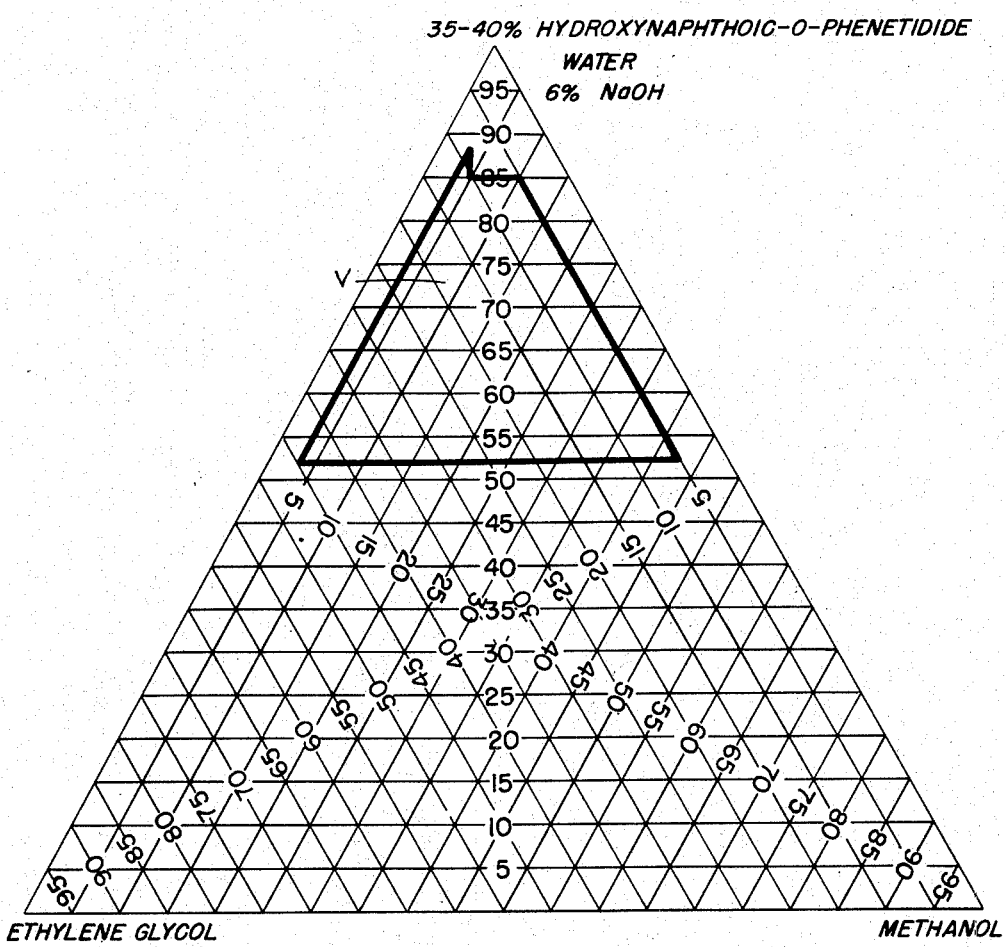
Figure 23:
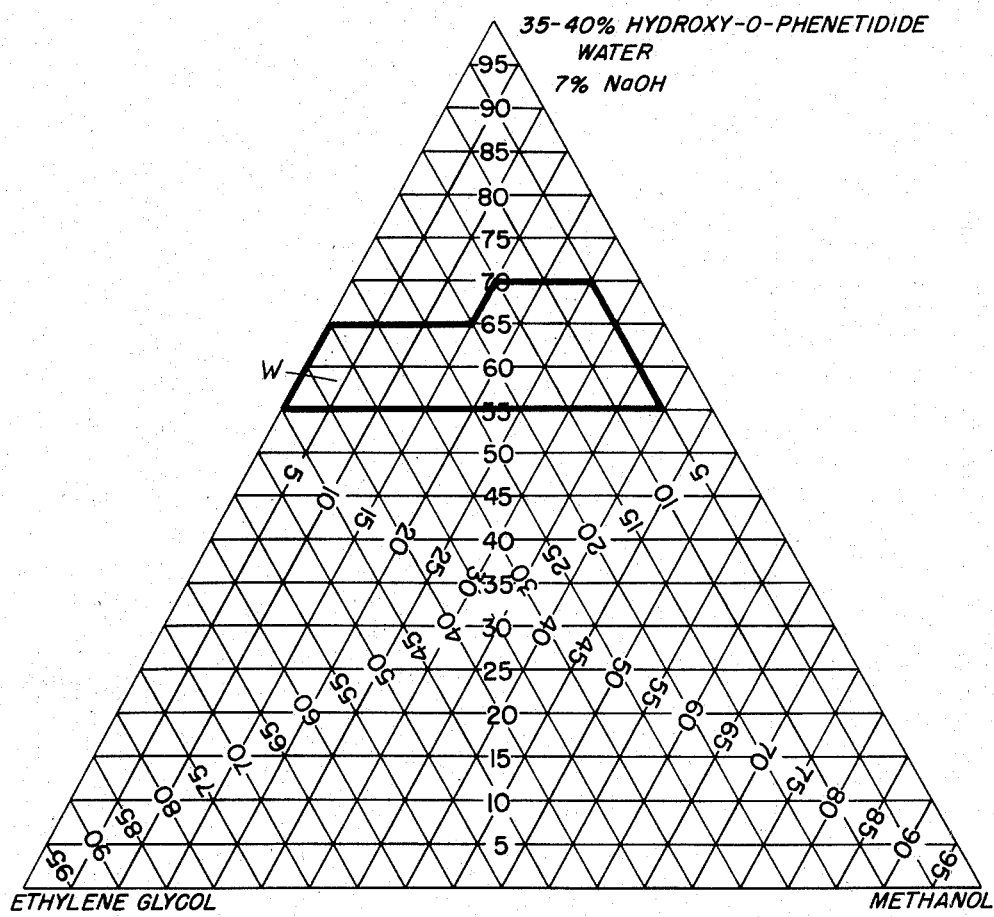
Figure 24:
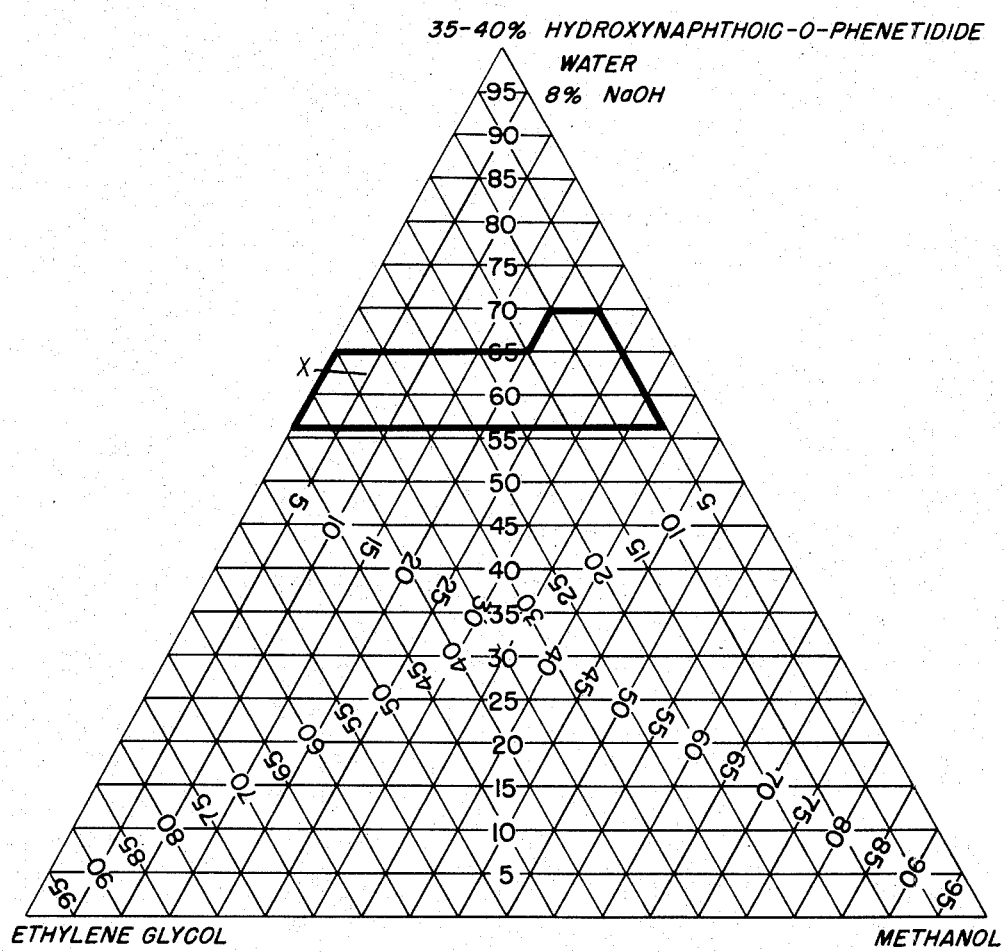
Figure 25:
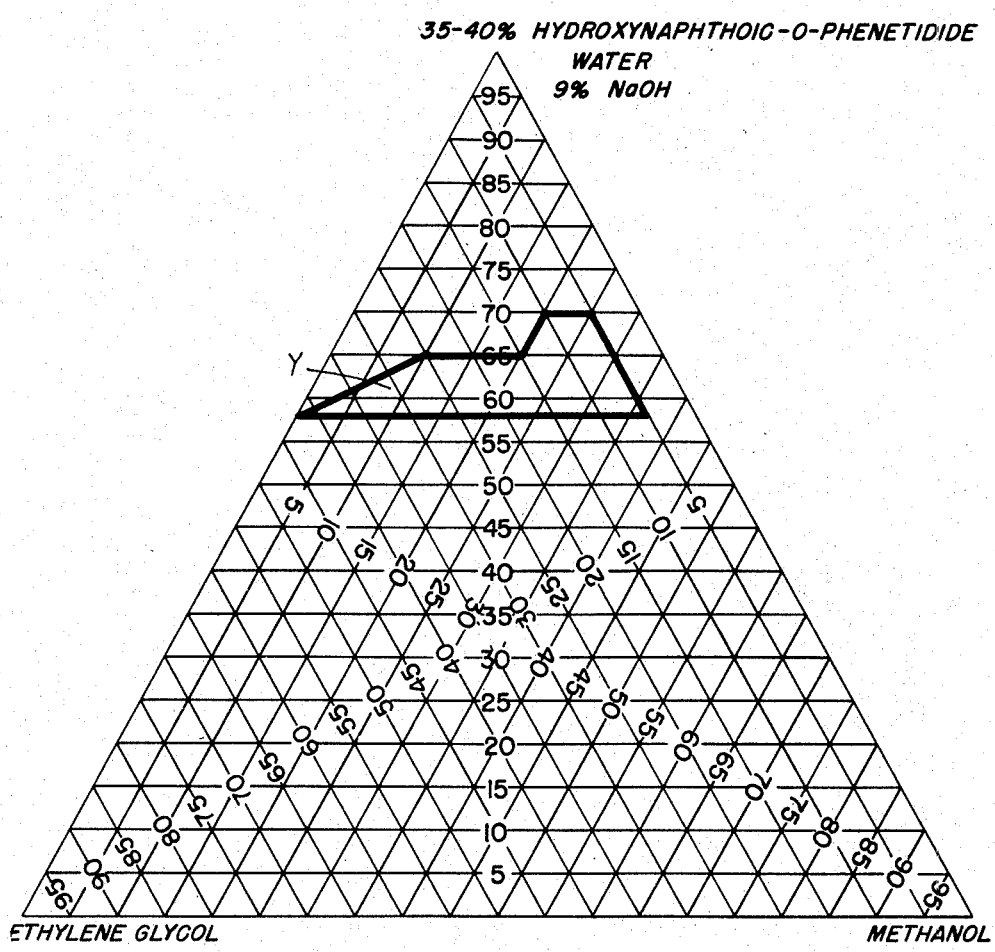
Figure 26:
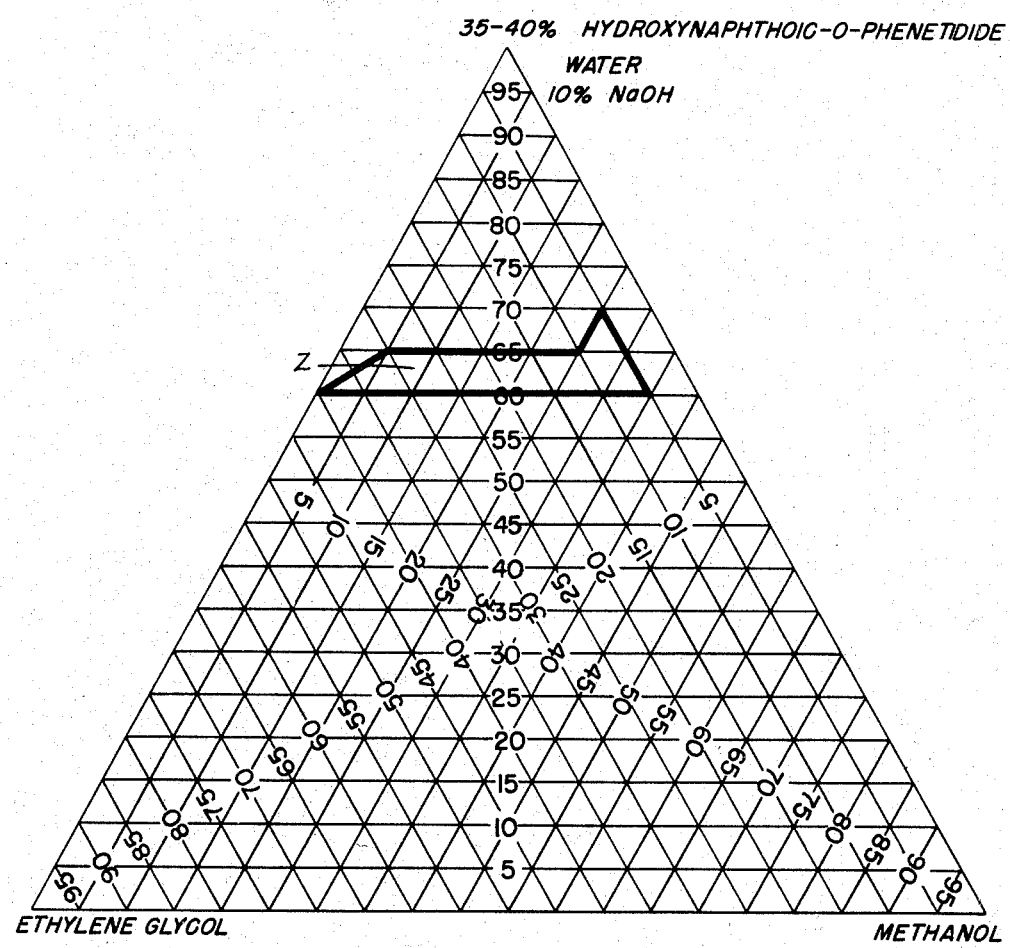
Figure 27:
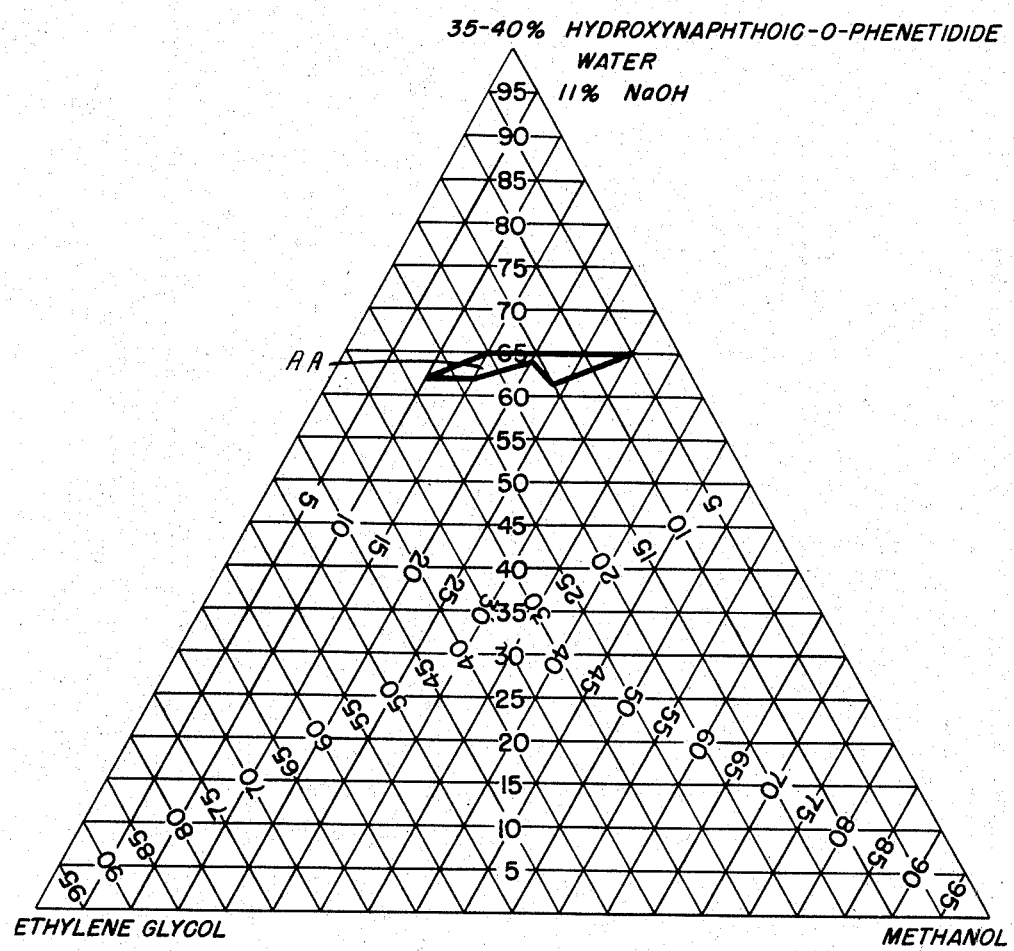
Figure 28:
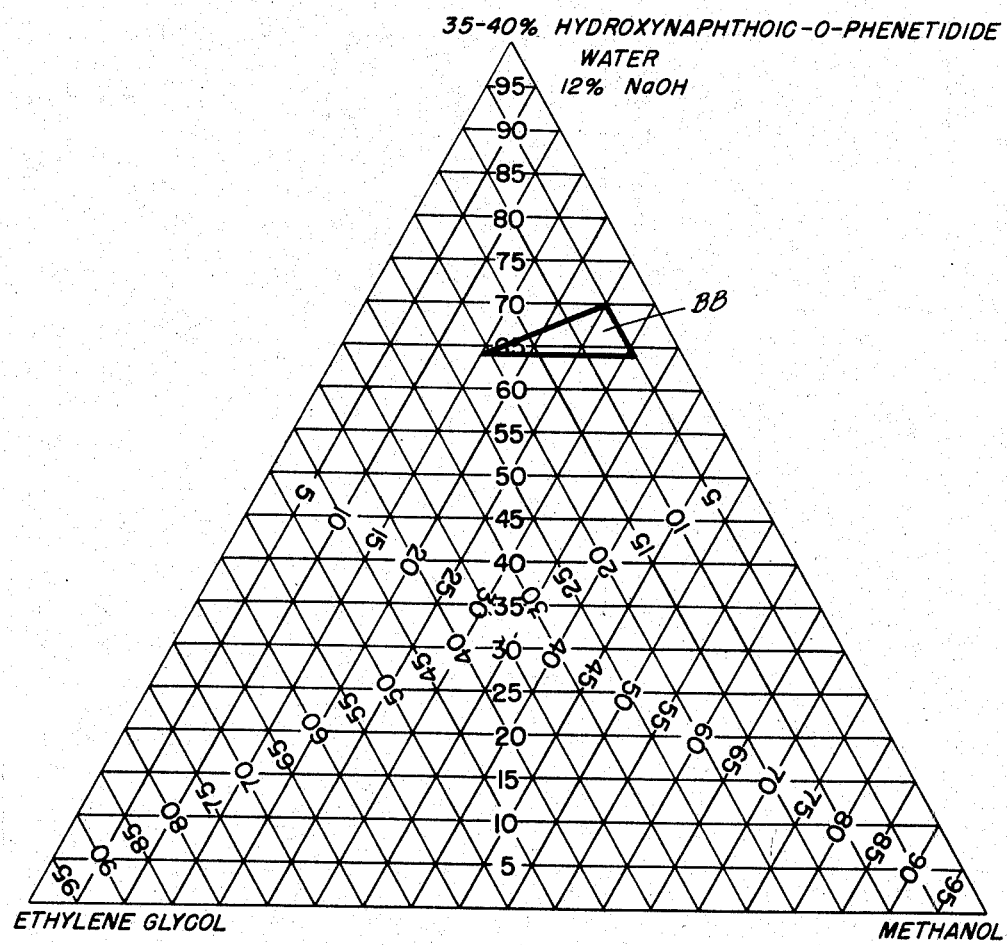

This composition is that of the point identified in Figure 21 as Example 67. It can be determined from the figure as has been described previously, by first selecting 40% hydroxynaphthoic-o-phenetidide and 5% caustic soda as the amounts to be used. Any point in area U can have these usages and be stable. It can be read from Figure 21 that the point marked Example 67 corresponds to a composition of 10% glycol and 15% methanol. The sum of these four components is 70%. The balance of 30% must be water.

Example 68

| | |
|---|---|
| Hydroxynaphthoic-o-phenetidide | 40.0 |
| NaOH | 5.0 |
| Ethylene glycol | 15.0 |
| Methyl alcohol | 5.0 |
| Water | 35.0 |
| | 100.0 |

Example 69

| | |
|---|---|
| Hydroxynaphthoic-o-phenetidide | 40.0 |
| NaOH | 6.0 |
| Ethylene glycol | 20.0 |
| Methyl alcohol | 15.0 |
| Water | 19.0 |
| | 100.0 |

Example 70

| | |
|---|---|
| Hydroxynaphthoic-o-phenetidide | 40.0 |
| NaOH | 7.0 |
| Ethylene glycol | 5.0 |
| Methyl alcohol | 30.0 |
| Water | 18.0 |
| | 100.0 |

Example 71

| | |
|---|---|
| Hydroxynaphthoic-o-phenetidide | 40.0 |
| NaOH | 7.0 |
| Ethylene glycol | 35.0 |
| Methyl alcohol | 5.0 |
| Water | 13.0 |
| | 100.0 |

Example 72

| | |
|---|---|
| Hydroxynaphthoic-o-phenetidide | 40.0 |
| NaOH | 8.0 |
| Ethylene glycol | 10.0 |
| Methyl alcohol | 30.0 |
| Water | 12.0 |
| | 100.0 |

Example 73

| | |
|---|---|
| Hydroxynaphthoic-o-phenetidide | 40.0 |
| NaOH | 8.0 |
| Ethylene glycol | 25.0 |
| Methyl alcohol | 15.0 |
| Water | 12.0 |
| | 100.0 |

Example 74

| | |
|---|---|
| Hydroxynaphthoic-o-phenetidide | 40.0 |
| NaOH | 9.0 |
| Ethylene glycol | 5.0 |
| Methyl alcohol | 30.0 |
| Water | 16.0 |
| | 100.0 |

Example 75

| | |
|---|---|
| Hydroxynaphthoic-o-phenetidide | 40.0 |
| NaOH | 9.0 |
| Ethylene glycol | 30.0 |
| Methyl alcohol | 5.0 |
| Water | 16.0 |
| | 100.0 |

Example 76

| | |
|---|---|
| Hydroxynaphthoic-o-phenetidide | 40.0 |
| NaOH | 10.0 |
| Ethylene glycol | 5.0 |
| Methyl alcohol | 30.0 |
| Water | 15.0 |
| | 100.0 |

Example 77

| | |
|---|---|
| Hydroxynaphthoic-o-phenetidide | 40.0 |
| NaOH | 10.0 |
| Ethylene glycol | 30.0 |
| Methyl alcohol | 5.0 |
| Water | 15.0 |
| | 100.0 |

Example 78

| | |
|---|---|
| Hydroxynaphthoic-o-phenetidide | 40.0 |
| NaOH | 11.0 |
| Ethylene glycol | 20.0 |
| Methyl alcohol | 15.0 |
| Water | 14.0 |
| | 100.0 |

Example 79

| | |
|---|---|
| Hydroxynaphthoic-o-phenetidide | 40.0 |
| NaOH | 12.0 |
| Ethylene glycol | 10.0 |
| Methyl alcohol | 25.0 |
| Water | 13.0 |
| | 100.0 |

Example 80

| | |
|---|---|
| Hydroxynaphthoic-o-phenetidide | 40.0 |
| NaOH | 5.0 |
| Ethylene glycol | 10.0 |
| Ethyl alcohol | 25.0 |
| Water | 20.0 |
| | 100.0 |

Example 81

| | |
|---|---|
| Hydroxynaphthoic-o-phenetidide | 40.0 |
| NaOH | 5.0 |
| Ethylene glycol | 15.0 |
| Ethyl alcohol | 10.0 |
| Water | 30.0 |
| | 100.0 |

Example 82

| | |
|---|---|
| Hydroxynaphthoic-o-phenetidide | 40.0 |
| KOH | 7.2 |
| Ethylene glycol | 15.0 |
| Methyl alcohol | 10.0 |
| Water | 27.8 |
| | 100.0 |

Example 83

| | |
|---|---|
| Hydroxynaphthoic-o-phenetidide | 40.0 |
| KOH | 7.2 |
| Ethylene glycol | 25.0 |
| Methyl alcohol | 10.0 |
| Water | 17.8 |
| | 100.0 |

Example 84

| | |
|---|---|
| Hydroxynaphthoic-o-phenetidide | 40.0 |
| KOH | 7.2 |
| Ethylene glycol | 10.0 |
| Ethyl alcohol | 25.0 |
| Water | 17.8 |
| | 100.0 |

Example 85

| | |
|---|---|
| Hydroxynaphthoic-o-phenetidide | 40.0 |
| KOH | 7.2 |
| Ethylene glycol | 25.0 |
| Ethyl alcohol | 10.0 |
| Water | 17.8 |
| | 100.0 |

Example 86

| | |
|---|---|
| Naphthol ASG | 20.0 |
| NaOH | 4.0 |
| Ethylene glycol | 15.0 |
| Methanol | 10.0 |
| Water | 51.0 |
| | 100.0 |

Figure 29:
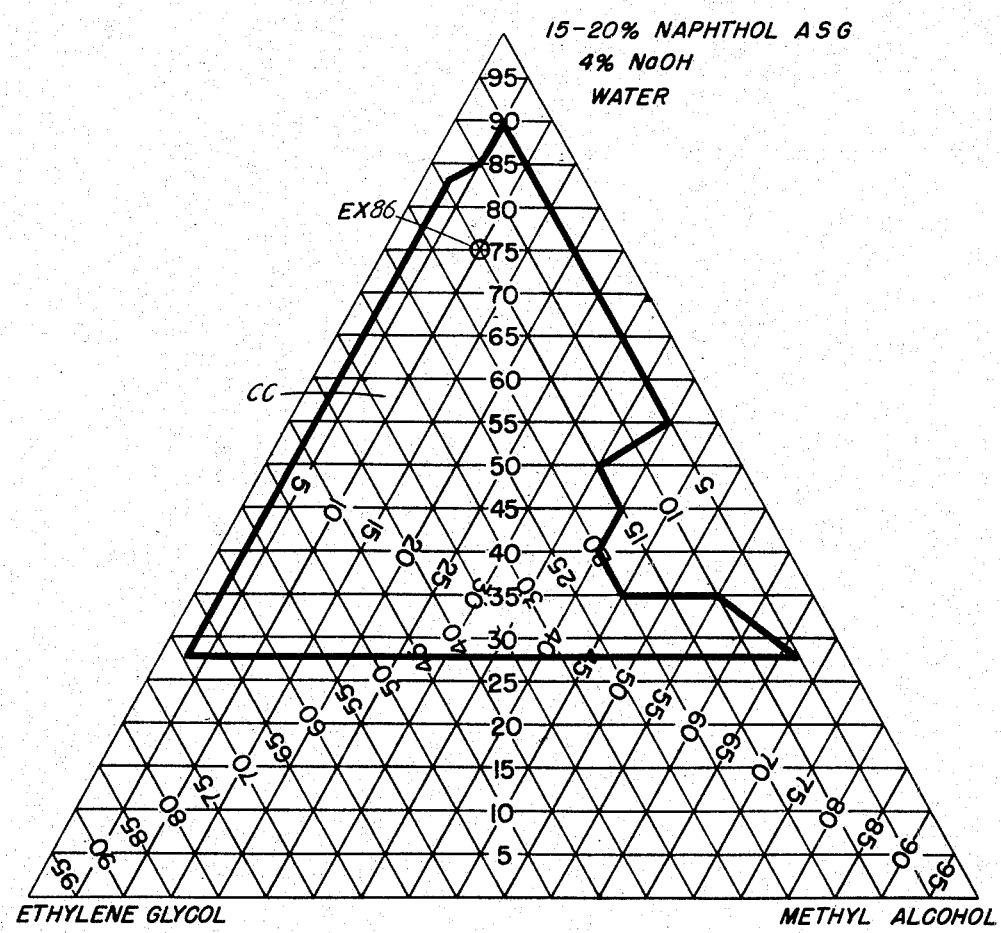
Figure 30:
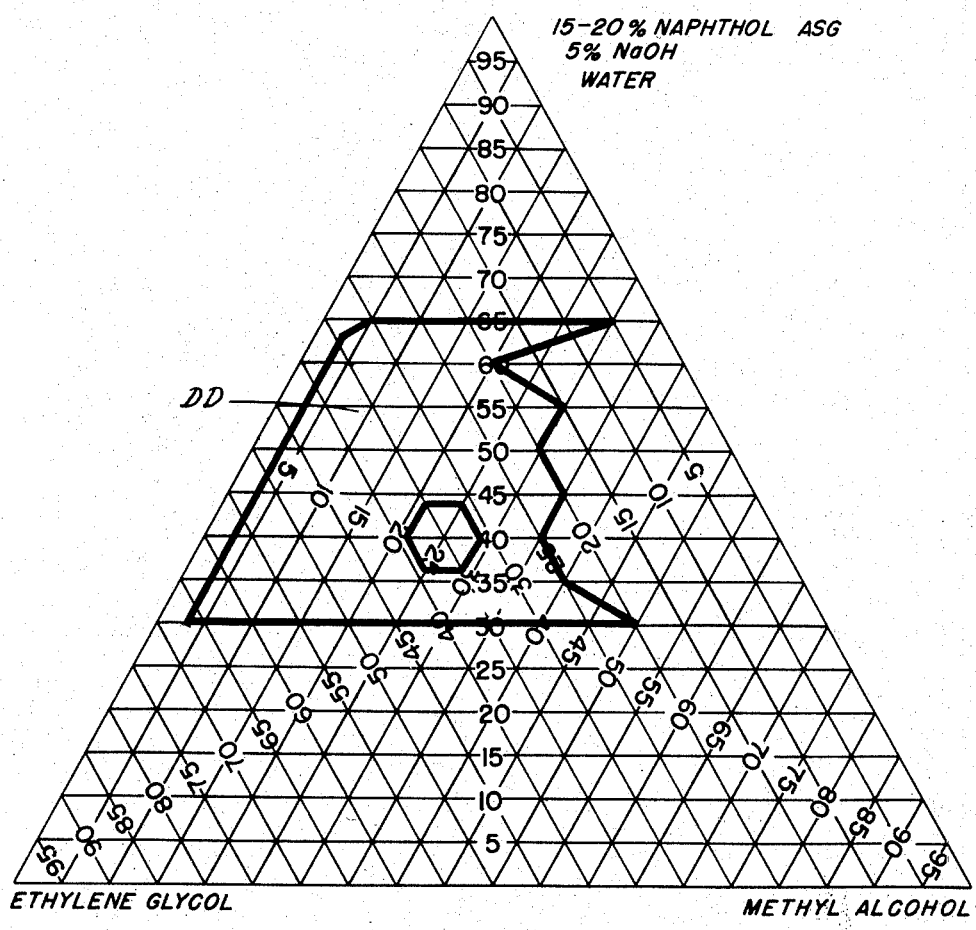
Figure 31:
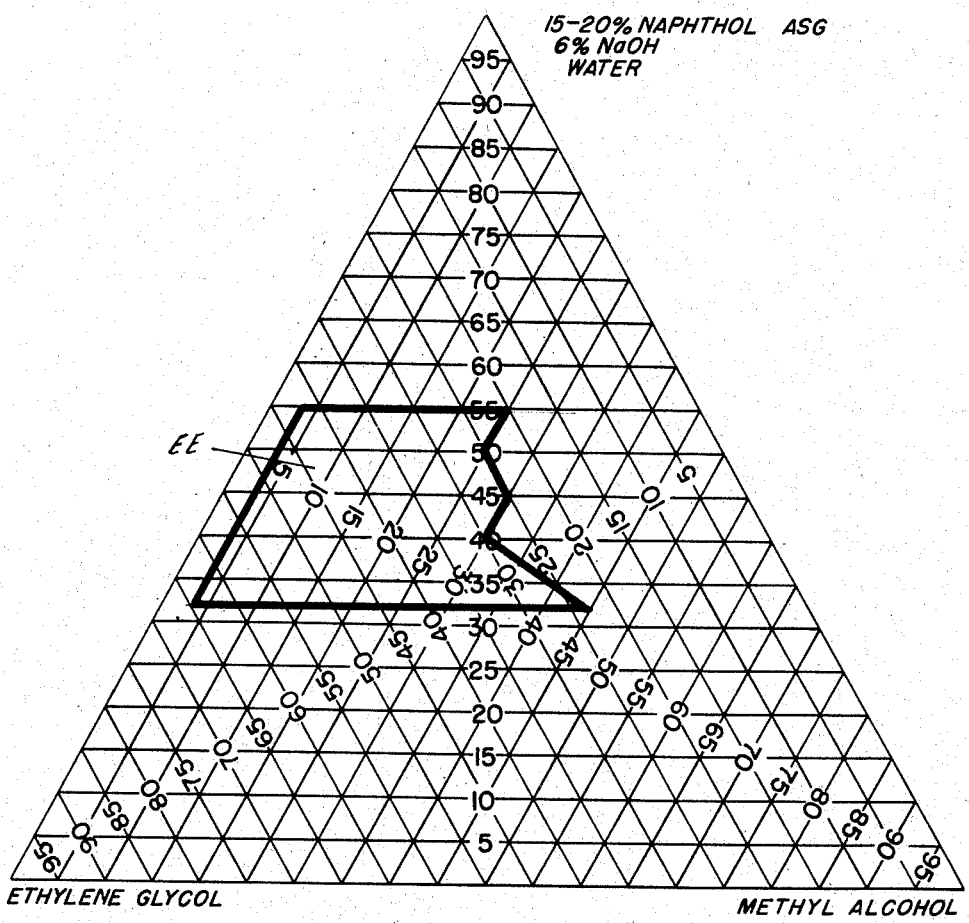
Figure 32:
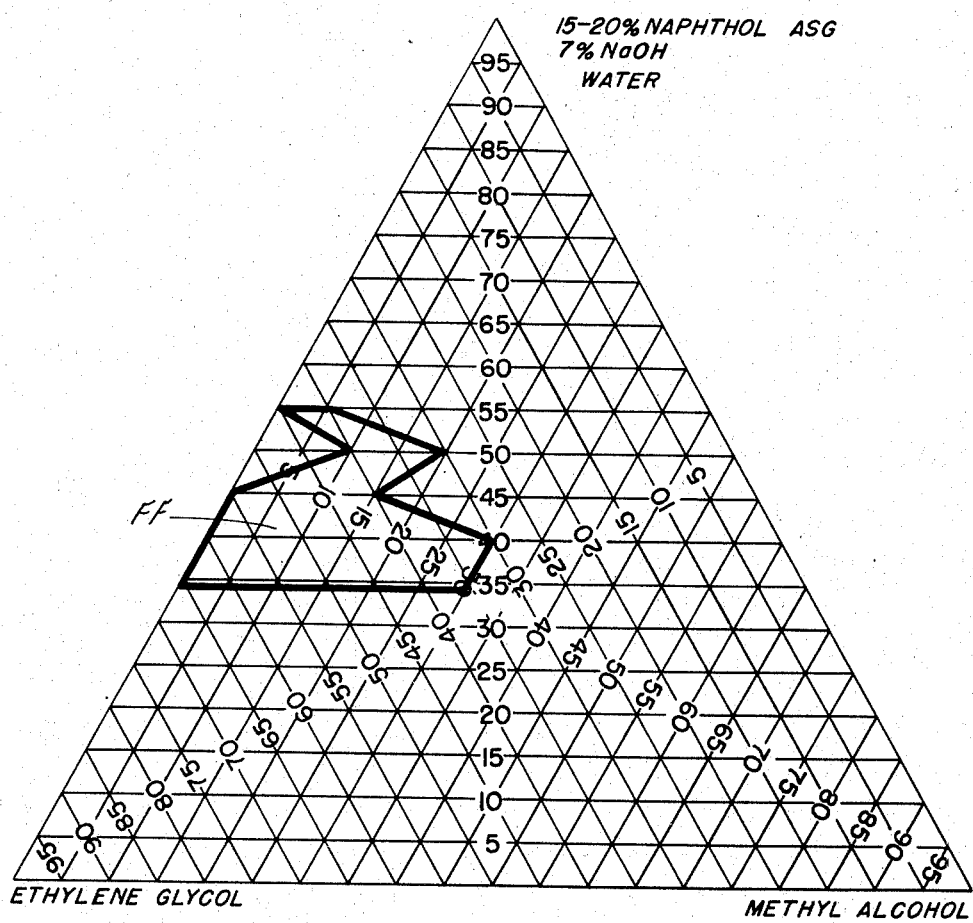
Figure 33:
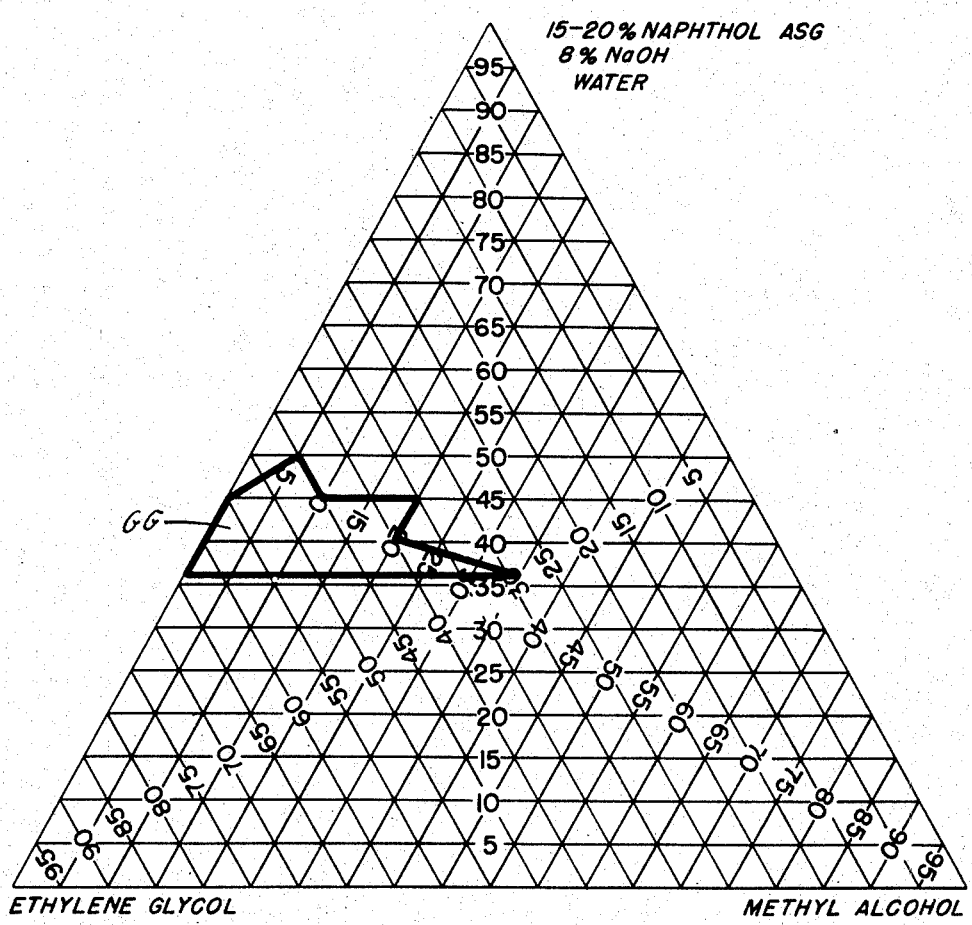
Figure 34:
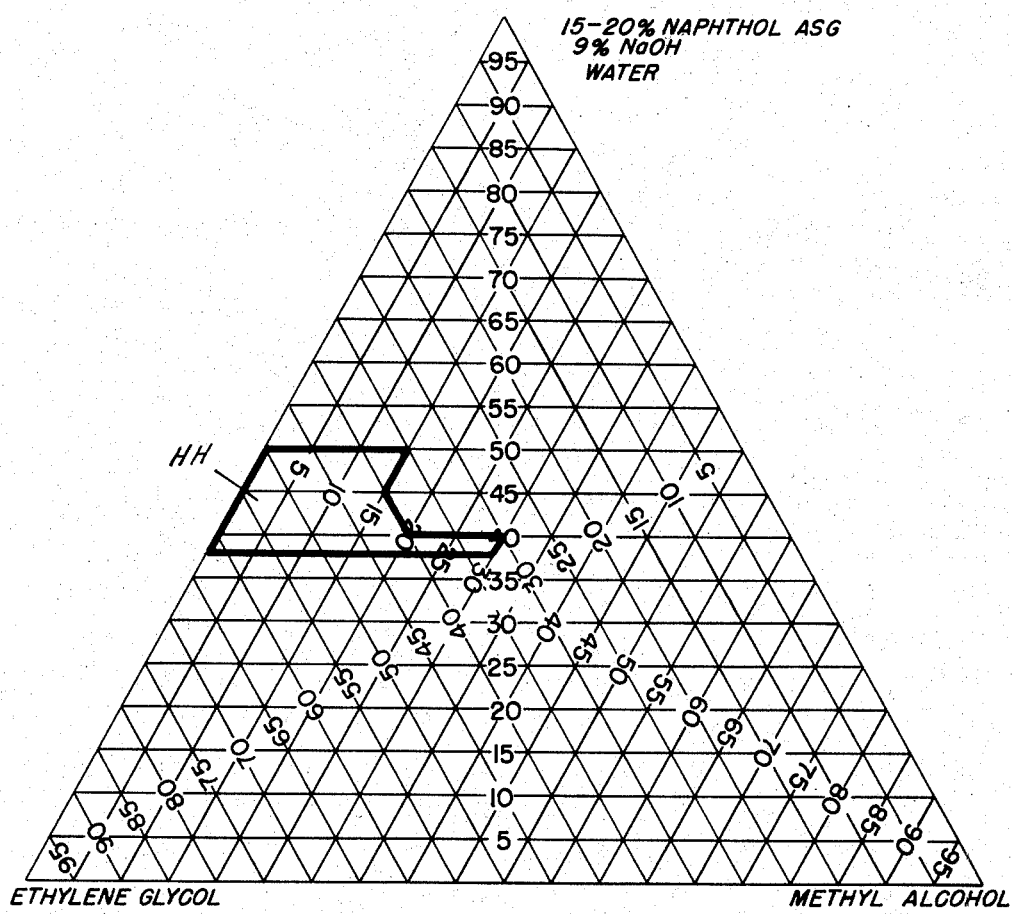
Figure 35:
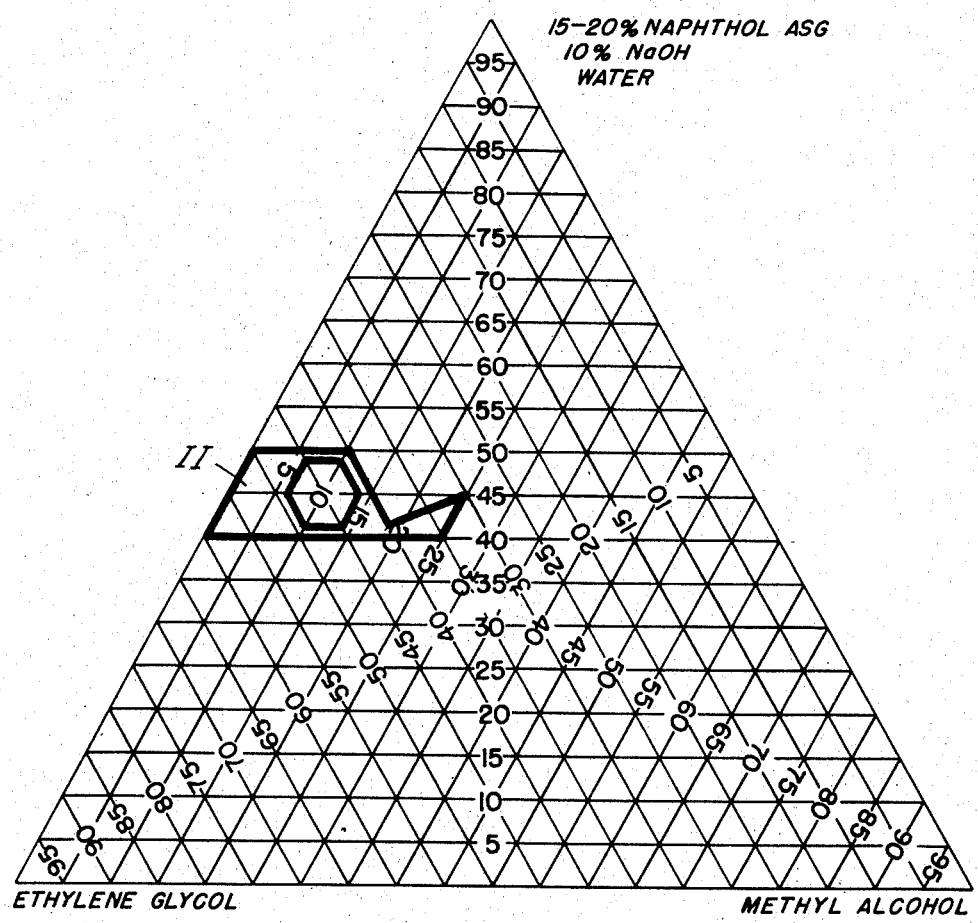
Figure 36:
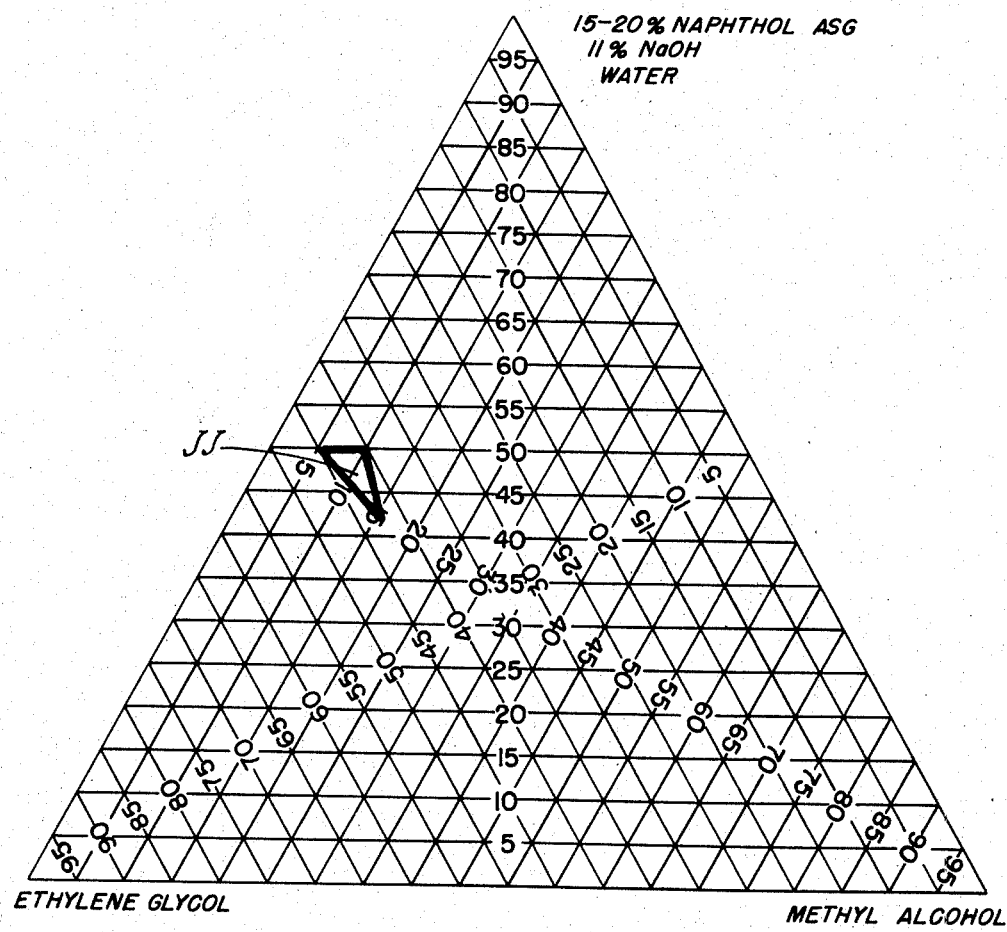

This composition is that of the point identified in Figure 29 as Example 86. It can be determined from the figure, as has been described previously, by first selecting 20% Naphthol ASG and 4% caustic soda as the amounts to be used. Any point in area CC can have these usages and be stable. It can be read from Figure 29 that the point marked Example 86 corresponds to a composition of 15% glycol and 10% methanol. The remainder (51%) is water.

Example 87

| | |
|---|---|
| Naphthol ASG | 20.0 |
| NaOH | 5.0 |
| Ethylene glycol | 35.0 |
| Methyl alcohol | 10.0 |
| Water | 30.0 |
| | 100.0 |

Example 88

| | |
|---|---|
| Naphthol ASG | 20.0 |
| NaOH | 5.0 |
| Ethylene glycol | 40.0 |
| Methyl alcohol | 20.0 |
| Water | 15.0 |
| | 100.0 |

Example 89

| | |
|---|---|
| Naphthol ASG | 20.0 |
| NaOH | 6.0 |
| Ethylene glycol | 35.0 |
| Methyl alcohol | 15.0 |
| Water | 24.0 |
| | 100.0 |

Example 90

| | |
|---|---|
| Naphthol ASG | 20.0 |
| NaOH | 6.0 |
| Ethylene glycol | 30.0 |
| Methyl alcohol | 30.0 |
| Water | 14.0 |
| | 100.0 |

Example 91

| | |
|---|---|
| Naphthol ASG | 20.0 |
| NaOH | 7.0 |
| Ethylene glycol | 55.0 |
| Methyl alcohol | 5.0 |
| Water | 13.0 |
| | 100.0 |

Example 92

| | |
|---|---|
| Naphthol ASG | 20.0 |
| NaOH | 7.0 |
| Ethylene glycol | 35.0 |
| Methyl alcohol | 15.0 |
| Water | 23.0 |
| | 100.0 |

Example 93

| | |
|---|---|
| Naphthol ASG | 20.0 |
| NaOH | 8.0 |
| Ethylene glycol | 50.0 |
| Methyl alcohol | 10.0 |
| Water | 12.0 |
| | 100.0 |

Example 94

| | |
|---|---|
| Naphthol ASG | 20.0 |
| NaOH | 8.0 |
| Ethylene glycol | 40.0 |
| Methyl alcohol | 20.0 |
| Water | 12.0 |
| | 100.0 |

Example 95

| | |
|---|---|
| Naphthol ASG | 20.0 |
| NaOH | 9.0 |
| Ethylene glycol | 50.0 |
| Water | 21.0 |
| | 100.0 |

Example 96

| | |
|---|---|
| Naphthol ASG | 20.0 |
| NaOH | 9.0 |
| Ethylene glycol | 35.0 |
| Methyl alcohol | 15.0 |
| Water | 21.0 |
| | 100.0 |

Example 97

| | |
|---|---|
| Naphthol ASG | 20.0 |
| NaOH | 10.0 |
| Ethylene glycol | 40.0 |
| Methyl alcohol | 10.0 |
| Water | 20.0 |
| | 100.0 |

Example 98

| | |
|---|---|
| Naphthol ASG | 20.0 |
| NaOH | 10.0 |
| Ethylene glycol | 60.0 |
| Water | 10.0 |
| | 100.0 |

Example 99

| | |
|---|---|
| Naphthol ASG | 20.0 |
| NaOH | 11.0 |
| Ethylene glycol | 45.0 |
| Methyl alcohol | 5.0 |
| Water | 19.0 |
| | 100.0 |

Example 100

| | |
|---|---|
| Naphthol ASG | 20.0 |
| NaOH | 11.0 |
| Ethylene glycol | 40.0 |
| Methyl alcohol | 10.0 |
| Water | 19.0 |
| | 100.0 |

Example 101

| | |
|---|---|
| Naphthol ASG | 20.0 |
| NaOH | 4.0 |
| Ethylene glycol | 15.0 |
| Ethyl alcohol | 20.0 |
| Water | 41.0 |
| | 100.0 |

Example 102

| | |
|---|---|
| Naphthol ASG | 20.0 |
| KOH | 5.4 |
| Ethylene glycol | 15.0 |
| Methyl alcohol | 20.0 |
| Water | 39.6 |
| | 100.0 |

Example 103

| | |
|---|---|
| Naphthol ASG | 20.0 |
| KOH | 6.7 |
| Ethylene glycol | 15.0 |
| Methyl alcohol | 25.0 |
| Water | 33.3 |
| | 100.0 |

Example 104

| | |
|---|---|
| Naphthol ASG | 20.0 |
| KOH | 5.4 |
| Ethylene glycol | 15.0 |
| Ethyl alcohol | 20.0 |
| Water | 33.6 |
| | 100.0 |

Example 105

| | |
|---|---|
| Naphthol ASG | 20.0 |
| KOH | 6.7 |
| Ethylene glycol | 15.0 |
| Ethyl alcohol | 25.0 |
| Water | 33.3 |
| | 100.0 |

This application is a continuation of our following copending applications, all abandoned: Serial Nos. 565,145, 565,065, 565,069, 565,068, 565,064, 564,947, 564,946, all filed February 13, 1956, which in turn were continuations-in-part, respectively of: Serial Nos. 333,267, filed January 26, 1953; 384,492, filed October 6, 1953; 366,734, filed July 8, 1953; 384,491, filed October 6, 1953; 340,638, filed March 5, 1953; 383,258, filed September 30, 1953; 396,932, filed December 8, 1953.

We claim:

1. A concentrated solution of hydroxynaphthoic anilide comprising from 35 to 40 parts of hydroxynaphthoic anilide, at least 1.0 mol but not more than 1.5 mols of an alkali metal hydroxide per mol of said anilide, water and ethylene glycol, all in proportions represented by areas A to D on Figures 1 to 4 of the annexed drawing, said solution being characterized by the property of being stable on storage.

2. The solution of claim 1 in which the alkali metal hydroxide is sodium hydroxide.

3. A concentrated solution of hydroxynaphthoic anilide comprising from 35 to 40 parts of hydroxynaphthoic anilide, at least 1.0 mol but not more than 1.5 mols of an alkali metal hydroxide per mole of said anilide, water, ethylene glycol, and an aliphatic monohydric alcohol of less than three carbons, all in proportions represented by areas A to D in Figures 1 to 4 of the annexed drawing, said solution being characterized by the property of being stable on storage.

4. A concentrated solution of hydroxynaphthoic anilide comprising from 35 to 40 parts of hydroxynaphthoic anilide, approximately one part of a protective colloid selected from the group consisting of protein fractions derived from corn and protein fractions derived from casein, at least 1.0 mol but not more than 1.5 mols of caustic soda per mol of said anilide, water, ethylene glycol and methanol, all in proportions represented by areas A to D of Figures 1 through 4 of the annexed drawing, said solution being characterized by the property of being stable on storage.

5. A concentrated solution of hydroxynaphthoic anilide comprising approximately 40 parts of hydroxynaphthoic anilide, one part of a protective colloid selected from the group consisting of protein fractions derived from corn and protein fractions derived from casein, six parts caustic soda, water, ethylene glycol, and methanol, all in proportions represented by area A on Figure 1 of the annexed drawing, said solution being characterized by being stable on storage.

6. A concentrated solution of hydroxynaphthoic anilide comprising approximately 40 parts of hydroxynaphthoic anilide, one part of a protective colloid selected from the group consisting of protein fractions derived from corn and protein fractions derived from casein, seven parts caustic soda, water, ethylene glycol, and methanol, all in proportions represented by area B on Figure 2 of the annexed drawing, said solution being characterized by being stable on storage.

7. A concentrated solution of hydroxynaphthoic anilide comprising approximately 40 parts of hydroxynaphthoic anilide, one part of a protective colloid selected from the group consisting of protein fractions derived from corn and protein fractions derived from casein, eight parts caustic soda, water, ethylene glycol, and methanol, all in proportions represented by area C on Figure 3 of the annexed drawing, said solution being characterized by being stable on storage.

8. A concentrated solution of hydroxynaphthoic anilide comprising approximately 40 parts of hydroxynaphthoic anilide, one part of a protective colloid selected from the group consisting of protein fractions derived from corn and protein fractions derived from casein, nine parts caustic soda, water, ethylene glycol, and methanol, all in proportions represented by area D on Figure 4 of the annexed drawing, said solution being characterized by being stable on storage.

9. A concentrated solution of hydroxynaphthoic-m-nitranilide comprising from about 15 parts to about 20 parts of hydroxynaphthoic-m-nitranilide, at least 1.1 mols but not more than 3.1 mols of an alkali metal hydroxide per mol of said nitranilide, water, ethylene glycol, and a monohydric aliphatic alcohol of less than three carbons, all in proportions represented by areas E to H of Figures 5 through 8 of the annexed drawings, the said solution being characterized by being stable on storage.

10. A concentrated solution of hydroxynaphthoic-m-nitranilide comprising from about 15 parts to about 20 parts of hydroxynaphthoic-m-nitranilide, at least 1.1 mols but not more than 3.1 mols of caustic soda per mol of said nitranilide, water, a monohydric aliphatic alcohol of less than three carbons, and ethylene glycol, all in proportions represented by areas E to H of Figures 5 through 8 of the annexed drawings, the said solution being characterized by being stable on storage.

11. A concentrated solution of hydroxynaphthoic-m-nitranilide comprising from about 15 parts to about 20 parts of hydroxynaphthoic-m-nitranilide, at least 1.1 mols but not more than 3.1 mols of caustic soda per mol of said nitranilide, water, ethylene glycol, and methyl alcohol, all in proportions represented by areas E to H of Figures 5 through 8 of the annexed drawings, the said solution being characterized by being stable on storage.

12. A concentrated solution of hydroxynaphthoic-m-nitranilide comprising approximately 20 parts of hydroxynaphthoic-m-nitranilide, at least 3 parts, but not more than 6 parts of caustic soda, water, ethylene glycol, and methyl alcohol, all in proportions represented by areas E to H of Figures 5 to 8 of the annexed drawings, said solution being characterized by being stable on storage.

13. A concentrated solution of hydroxynaphthoic-m-nitranilide comprising approximately 20 parts of hydroxynaphthoic-m-nitranilide, 3 parts of caustic soda, water, ethylene glycol, and methyl alcohol, all in proportions indicated by area E of Figure 5 of the annexed drawing, said solution being characterized by being stable on storage.

14. A concentrated solution of hydroxynaphthoic-m-nitranilide comprising approximately 20 parts of hydroxynaphthoic-m-nitranilide, 4 parts of caustic soda, water, ethylene glycol, and methyl alcohol, all in proportions represented by area F of Figure 6 of the annexed drawing, said solution being characterized by being stable on storage.

15. A concentrated solution of hydroxynaphthoic-m-nitranilide comprising about 20 parts of hydroxynaphthoic-m-nitranilide, 5 parts of caustic soda, water, ethylene glycol, and methyl alcohol, all in proportions represented by area G of Figure 7 of the annexed drawing, said solution being characterized by being stable on storage.

16. A concentrated solution of hydroxynaphthoic-m-nitranilide comprising approximately 20 parts of hydroxynaphthoic-m-nitranilide, 6 parts of caustic soda, water, ethylene glycol, and methyl alcohol, all in proportions represented by area H of Figure 8 of the annexed drawing, said solution being characterized by being stable on storage.

17. A concentrated solution of hydroxynaphthoic-o-toluidide comprising from about 35 to about 40 parts of hydroxynaphthoic-o-toluidide, at least 8.1 but not more than 11.7 parts of caustic potash, water, and ethylene glycol all in proportions represented by areas I to M in Figures 9 through 13 of the annexed drawings, said solution being characterized by the property of being stable on storage.

18. A concentrated solution of hydroxynaphthoic-o-toluidide comprising from about 35 to about 40 parts of hydroxynaphthoic-o-toluidide, at least 8.1 but not more than 11.7 parts of caustic potash, water, ethylene glycol, and an aliphatic monohydric alcohol containing less than three carbon atoms, all in proportions represented by the areas I to M of Figures 9 through 13 of the annexed drawings, said solution being characterized by the property of being stable on storage.

19. A concentrated solution of hydroxynaphthoic-o-toluidide comprising from about 35 to about 40 parts of hydroxynaphthoic-o-toluidide, at least 8.1 but not more than 11.7 parts caustic potash, water, ethylene glycol, and methanol, all in proportions represented by the areas I to M of Figures 9 through 13 of the annexed drawings, said solution being characterized by the property of being stable on storage.

20. A concentrated solution of hydroxynaphthoic-o-toluidide comprising approximately 40 parts of hydroxynaphthoic-o-toluidide, at least 8.1 but not more than 11.7 parts caustic potash, water, ethylene glycol, and methanol, all in proportions represented by areas I to M in Figures 9 through 13 of the annexed drawings, said solution being characterized by the property of being stable on storage.

21. A concentrated solution of hydroxynaphthoic-o-toluidide comprising approximately 40 parts of hydroxynaphthoic-o-toluidide, 8.1 parts caustic potash, water, ethylene glycol, and methanol, all in proportions represented by area I in Figure 9 of the annexed drawing, said solution being characterized by the property of being stable on storage.

22. A concentrated solution of hydroxynaphthoic-o-toluidide comprising approximately 40 parts of hydroxynaphthoic-o-toluidide, 9 parts caustic potash, water, ethylene glycol, and methanol, all in proportions represented by area J in Figure 10 of the annexed drawing, said solution being characterized by the property of being stable on storage.

23. A solution of concentrated hydroxynaphthoic-o-toluidide comprising approximately 40 parts of hydroxynaphthoic-o-toluidide, 9.9 parts caustic potash, water, ethylene glycol, and methanol, all in proportions indicated by area K in Figure 11 of the annexed drawing, said solution being characterized by the property of being stable on storage.

24. A concentrated solution of hydroxynaphthoic-o-toluidide comprising approximately 40 parts of hydroxynaphthoic-o-toluidide, 10.8 parts caustic potash, water, ethylene glycol, and methanol, all in proportions represented by area L in Figure 12 of the annexed drawing, said solution being characterized by the property of being stable on storage.

25. A concentrated solution of hydroxynaphthoic-o-toluidide, comprising approximately 40 parts of hydroxynaphthoic-o-toluidide, 11.7 parts caustic potash, water, ethylene glycol, and methanol, all in proportions represented by area M in Figure 13 of the annexed drawing, said solution being characterized by the property of being stable on storage.

26. A concentrated solution of hydroxynaphthoic-o- anisidide comprising from about 35 to 40 parts of hydroxynaphthoic-o-anisidide, at least 0.9 mol but not more than 1.9 mols of an alkali metal hydroxide, per mol of said anisidide, water, ethylene glycol, and a monohydric aliphatic alcohol of less than three carbons, all in proportions represented by areas N to R in Figures 14 through 18 of the annexed drawings, said solution being characterized by the property of being stable on storage.

27. A concentrated solution of hydroxynaphthoic-o-anisidide comprising from about 35 to about 40 parts of hydroxynaphthoic-o-anisidide, at least 5 parts but not more than 9 parts of caustic soda, water, ethylene glycol, and a monohydric aliphatic alcohol containing less than 3 carbon atoms, all in proportions represented by areas N to R in Figures 14 through 18 of the annexed drawings, said solution being characterized by the property of being stable on storage.

28. A concentrated solution of hydroxynaphthoic-o-anisidide comprising from about 35 to about 40 parts of hydroxynaphthoic-o-anisidide, at least 5 parts but not more than 9 parts of caustic soda, water, ethylene glycol, and methyl alcohol, all in proportions represented by areas N to R of Figures 14 through 18 of the annexed drawings, said solution being characterized by the property of being stable on storage.

29. A concentrated solution of hydroxynaphthoic-o-anisidide comprising approximately 40 parts of hydroxynaphthoic-o-anisidide, 5 parts of caustic soda, water, ethylene glycol, and methyl alcohol, all in proportions represented by area N of Figure 14 of the annexed drawings, said solution being characterized by the property of being stable on storage.

30. A concentrated solution of hydroxynaphthoic-o-anisidide comprising approximately 40 parts of hydroxynaphthoic-o-anisidide, 6 parts of caustic soda, water, ethylene glycol, and methyl alcohol, all in proportions represented by area O of Figure 15 of the annexed drawings, said solution being characterized by the property of being stable on storage.

31. A concentrated solution of hydroxynaphthoic-o-anisidide comprising approximately 40 parts of hydroxynaphthoic-o-anisidide, 7 parts of caustic soda, water, ethylene glycol, and methyl alcohol, all in proportions represented by area P of Figure 16 of the annexed drawings, said solution being characterized by the property of being stable on storage.

32. A concentrated solution of hydroxynaphthoic-o-anisidide comprising approximately 40 parts of hydroxynaphthoic-o-anisidide, 8 parts of caustic soda, water, ethylene glycol, and methyl alcohol, all in proportions represented by area Q of Figure 17 of the annexed drawings, said solution being characterized by the property of being stable on storage.

33. A concentrated solution of hydroxynaphthoic-o-anisidide comprising 40 parts of hydroxynaphthoic-o-anisidide, 9 parts of caustic soda, water, ethylene glycol, and methyl alcohol, all in proportions represented by area R of Figure 18 of the annexed drawing, said solution being characterized by the property of being stable on storage.

34. A concentrated solution of hydroxynaphthoic β-naphthylamide comprising from 35 to 40 parts of hydroxynaphthoic β-naphthylamide, at least 1.0 mol but not more than 1.3 mols of an alkali metal hydroxide per mol of hydroxynaphthoic β-naphthylamide, water, an aliphatic monohydric alcohol of less than 3 carbons, and ethylene glycol, all in proportions represented by areas S and T of Figures 19 and 20 of the annexed drawings, said solution being characterized by the property of being stable on storage.

35. A concentrated solution of hydroxynaphthoic β-naphthylamide comprising from 35 to 40 parts of hydroxynaphthoic β-naphthylamide, at least five but not more than six parts of caustic soda, water, ethylene glycol, and an aliphatic monohydric alcohol containing less than three carbon atoms, all in proportions represented by the areas S and T of Figures 19 and 20 of the annexed drawings, said solution being characterized by the property of being stable on storage.

36. A concentrated solution of hydroxynaphthoic β-naphthylamide comprising from 35 to 40 parts of hydroxynaphthoic β-naphthylamide, approximately one part of a protective colloid selected from the group consisting of protein fractions derived from corn, protein fractions derived from casein, from five to six parts of caustic soda, water, ethylene glycol, and methanol, all in proportions represented by the areas S and T of Figures 19 and 20 of the annexed drawings, said solution being characterized by the property of being stable on storage.

37. A concentrated solution of hydroxynaphthoic β-naphthylamide comprising approximately 40 parts of hydroxynaphthoic β-naphthylamide, one part of a protective colloid selected from the group consisting of protein fractions derived from corn, protein fractions derived from casein, at least five but not more than six parts of caustic soda, water, ethylene glycol, and methanol, all in proportions represented by areas S and T in Figures 19 and 20 of the annexed drawings, said solution being characterized by the property of being stable on storage.

38. A concentrated solution of hydroxynaphthoic β-naphthylamide comprising approximately 40 parts of hydroxynaphthoic β-naphthylamide, one part of a protective colloid selected from the group consisting of protein fractions derived from corn, protein fractions derived from casein, six parts caustic soda, water, ethylene glycol, and methanol, all in proportions represented by area T of Figure 20 of the annexed drawing, said solution being characterized by the property of being stable on storage.

39. A concentrated solution of hydroxynaphthoic β-naphthylamide comprising approximately 40 parts of hydroxynaphthoic β-naphthylamide, one part of a protective colloid selected from the group consisting of protein fractions derived from corn, protein fractions derived from casein, five parts caustic soda, water, ethylene glycol, and methanol, all in proportions represented by area S of Figure 19 of the annexed drawing, said solution being characterized by the property of being stable on storage.

40. A concentrated solution of hydroxynaphthoic-o-phenetidide comprising from about 35 to about 40 parts of hydroxynaphthoic-o-phenetidide, at least 1.0 mol but not more than 2.6 mols of an alkali metal hydroxide per mol of said phenetidide, water, ethylene glycol, and a monohydric aliphatic alcohol, of less than three carbon atoms all in proportions represented by areas U, V, W, X, Y, Z, AA and BB in Figures 21 through 28 of of the annexed drawings, said solution being characterized by the property of being stable on storage.

41. A concentrated solution of hydroxynaphthoic-o-phenetidide, comprising from about 35 to about 40 parts of hydroxynaphthoic-o-phenetidide, at least 1.0 mol but not more than 2.6 mols of caustic soda per mol of said phenetidide, water, ethylene glycol, and a monohydric aliphatic alcohol containing less than 3 carbon atoms, all in proportions represented by areas U, V, W, X, Y, Z, AA and BB in Figures 21 through 28 of the annexed drawings, said solution being characterized by the property of being stable on storage.

42. A concentrated solution of hydroxynaphthoic-o-phenetidide comprising from about 35 to about 40 parts of hydroxynaphthoic-o-phenetidide, at least 1.0 mol but not more than 2.6 mols of caustic soda per mol of said phenetidide, water, ethylene glycol, and methyl alcohol, all in proportions represented by areas U, V, W, X, Y, Z, AA and BB in Figures 21 through 28 of the annexed drawings, said solution being characterized by the property of being stable on storage.

43. A concentrated solution of hydroxynaphthoic-o-phenetidide comprising approximately 40 parts of hydroxynaphthoic-o-phenetidide, at least 5, but not more than 12 parts of caustic soda, water, ethylene glycol, and methyl alcohol, all in proportions represented by areas U, V, W, X, Y, Z, AA and BB in Figures 21 through 28 of the annexed drawings, said solution being characterized by the property of being stable on storage.

44. A concentrated solution of hydroxynaphthoic-o-phenetidide comprising approximately 40 parts of hydroxynaphthoic-o-phenetidide, 5 parts caustic soda, water, ethylene glycol, and methyl alcohol, all in proportions represented by area U in Figure 21 of the annexed drawing, said solution being characterized by the property of being stable on storage.

45. A concentrated solution of hydroxynaphthoic-o-phenetidide comprising approximately 40 parts of hydroxynaphthoic-o-phenetidide, 6 parts of caustic soda, water, ethylene glycol, and methyl alcohol, all in proportions represented by area V in Figure 22 of the annexed drawing, said solution being characterized by the property of being stable on storage.

46. A concentrated solution of hydroxynaphthoic-o-phenetidide comprising approximately 40 parts of hydroxynaphthoic-o-phenetidide, 7 parts of caustic soda, water, ethylene glycol, and methyl alcohol, all in proportions indicated by area W in Figure 23 of the annexed drawing, said solution being characterized by the property of being stable on storage.

47. A concentrated solution of hydroxynaphthoic-o-phenetidide comprising approximately 40 parts of hydroxynaphthoic-o-phenetidide, 8 parts of caustic soda, water, ethylene glycol, and methyl alcohol, all in proportions represented by area X in Figure 24 of the annexed drawing, said solution being characterized by the property of being stable on storage.

48. A concentrated solution of hydroxynaphthoic-o-phenetidide comprising approximately 40 parts of hydroxynaphthoic-o-phenetidide, 9 parts of caustic soda, water, ethylene glycol, and methyl alcohol, all in proportions represented by area Y in Figure 25 of the annexed drawing, said solution being characterized by the property of being stable on storage.

49. A concentrated solution of hydroxynaphthoic-o-phenetidide comprising approximately 40 parts of hydroxynaphthoic-o-phenetidide, 10 parts of caustic soda, water, ethylene glycol, and methyl alcohol, all in proportions represented by area Z in Figure 26 of the annexed drawing, said solution being characterized by the property of being stable on storage.

50. A concentrated solution of hydroxynaphthoic-o-phenetidide comprising approximately 40 parts of hydroxynaphthoic-o-phenetidide, 11 parts of caustic soda, water, ethylene glycol, and methyl alcohol, all in proportions represented by area AA in Figure 27 of the annexed drawing, said solution being characterized by the property of being stable on storage.

51. A concentrated solution of hydroxynaphthoic-o-phenetidide comprising approximately 40 parts of hydroxynaphthoic-o-phenetidide, 12 parts of caustic soda, water, ethylene glycol, and methyl alcohol, all in proportions represented by area BB in Figure 28 of the annexed drawing, said solution being characterized by the property of being stable on storage.

52. A concentrated solution of Naphthol ASG comprising from about 15 parts to about 20 parts of Naphthol ASG, at least 1.9 mols but not more than 7.0 mols of an alkali metal hydroxide per mol of Naphthol ASG, water, ethylene glycol, and a monohydric aliphatic alcohol of less than three carbons, all in proportions represented by areas CC to JJ of Figures 29 through 36 of the annexed drawings, said solution being characterized by the property of being stable on storage.

53. A concentrated solution of Naphthol ASG comprising from 15 parts to 20 parts of Naphthol ASG, at least 4 parts but not more than 11 parts of caustic soda, water, ethylene glycol, and a monohydric aliphatic alcohol containing less than 3 carbon atoms, all in proportions represented by areas CC to JJ of Figures 29 through 36 of the annexed drawings, said solution being characterized by the property of being stable on storage.

54. A concentrated solution of Naphthol ASG comprising from 15 parts to 20 parts of Naphthol ASG, at least 4 parts but not more than 11 parts of caustic soda, water, ethylene glycol, and methyl alcohol, all in proportions represented by areas CC to JJ of Figures 29 through 36 of the annexed drawings, said solution being characterized by the property of being stable on storage.

55. A concentrated solution of Naphthol ASG comprising approximately 20 parts of Naphthol ASG, at least 4 parts, but not more than 11 parts of caustic soda, water, ethylene glycol, and methyl alcohol, all in proportions represented by areas CC to JJ in Figures 29 through 36 of the annexed drawings, said solution being characterized by the property of being stable on storage.

56. A concentrated solution of Naphthol ASG comprising approximately 20 parts of Naphthol ASG, 4 parts of caustic soda, water, ethylene glycol, and methyl alcohol, all in proportions represented by area CC in Figure 29 of the annexed drawing, said solution being characterized by the property of being stable on storage.

57. A concentrated solution of Naphthol ASG comprising approximately 20 parts of Naphthol ASG, 5 parts of caustic soda, water, ethylene glycol, and methyl alcohol, all in proportions represented by area DD in Figure 30 of the annexed drawing, said solution being characterized by the property of being stable on storage.

58. A concentrated solution of Naphthol ASG comprising about 20 parts of Naphthol ASG, 6 parts of caustic soda, water, ethylene glycol, and methyl alcohol, all in proportions represented by area EE in Figure 31 of the annexed drawing, said solution being characterized by the property of being stable on storage.

59. A concentrated solution of Naphthol ASG comprising approximately 20 parts of Naphthol ASG, 7 parts of caustic soda, water, ethylene glycol, and methyl alcohol, all in proportions represented by area FF in Figure 32 of the annexed drawing, said solution being characterized by the property of being stable on storage.

60. A concentrated solution of Naphthol ASG comprising approximately 20 parts of Naphthol ASG, 8 parts of caustic soda, water, ethylene glycol, and methyl alcohol, all in proportions represented by area GG in Figure 33 of the annexed drawing, said solution being characterized by the property of being stable on storage.

61. A concentrated solution of Naphthol ASG comprising approximately 20 parts of Naphthol ASG, 9 parts of caustic soda, water, ethylene glycol, and methyl alcohol, all in proportions represented by area HH in Figure 34 of the annexed drawing, said solution being characterized by the property of being stable on storage.

62. A concentrated solution of Naphthol ASG comprising approximately 20 parts of Naphthol ASG, 10 parts of caustic soda, water, ethylene glycol, and methyl alcohol, all in proportions represented by area II in Figure 35 of the annexed drawing, said solution being characterized by the property of being stable on storage.

63. A concentrated solution of Naphthol ASG comprising approximately 20 parts of Naphthol ASG, 11 parts of caustic soda, water, ethylene glycol, and methyl alcohol, all in proportions represented by area JJ in Figure 36 of the annexed drawing, said solution being characterized by the property of being stable on storage.

References Cited in the file of this patent

UNITED STATES PATENTS

| | | |
|---|---|---|
| 1,678,648 | Replogle | July 31, 1928 |
| 1,870,498 | Ellner | Aug. 9, 1932 |
| 1,942,774 | Roulet | Jan. 9, 1934 |

(Other references on following page)

UNITED STATES PATENTS

| | | |
|---|---|---|
| 2,078,861 | Lantz | Apr. 27, 1937 |
| 2,214,559 | Lecher | Sept. 10, 1940 |

FOREIGN PATENTS

| | | |
|---|---|---|
| 12,998 | Great Britain | 1910 |

OTHER REFERENCES

Am. Dyestuff Reporter, May 1, 1950, vol. 39, No. 9, p. VII, and vol. 41, No. 10, May 12, 1952, p. VII.

Revue Gen. Mat. Col. for April 1935, vol. 39, p. 142, art. by Sisley.

J. Lindsay, Jr.: "The Application of Naphthol Dyes to Cotton and Other Textiles," Cotton, vol. 103, No. 11, pp. 59–61 (November 1939).

K. Venkataraman: "The Chem. of Synthetic Dyes," Acad. Press Inc., N.Y., 1952, p. 673.

Chem. Tech. of Dyeing and Printing," by L. Diserens, pub. 1948 by Reinhold Co., N.Y.C., pp. 230–239, 226–229.